United States Patent
Hirota

(10) Patent No.: US 9,467,243 B2
(45) Date of Patent: Oct. 11, 2016

(54) PACKET RELAY DEVICE AND PACKET TRANSMISSION DEVICE

(71) Applicant: FUJITSU LIMITED, Kawasaki-shi, Kanagawa (JP)

(72) Inventor: Masaki Hirota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 14/291,460

(22) Filed: May 30, 2014

(65) Prior Publication Data

US 2014/0362868 A1 Dec. 11, 2014

(30) Foreign Application Priority Data

Jun. 7, 2013 (JP) .................................. 2013-121129

(51) Int. Cl.
*H04J 3/06* (2006.01)
*H04L 12/835* (2013.01)
*H04L 12/823* (2013.01)

(52) U.S. Cl.
CPC ............. *H04J 3/0673* (2013.01); *H04L 47/30* (2013.01); *H04L 47/32* (2013.01); *H04J 3/0667* (2013.01)

(58) Field of Classification Search
CPC ................. H04L 49/1553; H04L 2012/5678; H04L 49/108; H04L 2012/5651; H04L 2012/5646; H04L 2012/5649; H04L 12/5601; H04Q 11/0478
See application file for complete search history.

(56) References Cited

U.S. PATENT DOCUMENTS

| | | | |
|---|---|---|---|
| 2003/0091047 A1* | 5/2003 | Pate ..................... | H04L 12/5601 370/392 |
| 2004/0114516 A1* | 6/2004 | Iwata .................. | H04L 12/5602 370/230.1 |
| 2004/0114607 A1* | 6/2004 | Shay ........................ | H04L 65/80 370/395.42 |
| 2004/0233931 A1* | 11/2004 | Cohen ................... | H04L 43/087 370/468 |
| 2008/0008203 A1* | 1/2008 | Frankkila ............ | H04L 47/2416 370/412 |
| 2010/0149976 A1* | 6/2010 | Lee .......................... | H04L 47/10 370/231 |
| 2014/0064297 A1* | 3/2014 | Hirota ................... | H04J 3/0667 370/412 |

FOREIGN PATENT DOCUMENTS

| | | |
|---|---|---|
| JP | 2007-158425 | 6/2007 |
| JP | 2008-22131 | 1/2008 |
| JP | 2012-34224 | 2/2012 |

* cited by examiner

*Primary Examiner* — Jung-Jen Liu
(74) *Attorney, Agent, or Firm* — Staas & Halsey LLP

(57) ABSTRACT

A packet relay device includes: a first buffer configured to store a packet; and a processor coupled to the first buffer and configured to: calculate a delay time for reading from the first buffer based on a packet length and a packet interval of the packet which is inputted to the first buffer, and delay the packet according to the calculated delay time, the packet being read from the first buffer.

16 Claims, 30 Drawing Sheets

FIG. 3

| BITS | | | | | | | | OCTETS |
|---|---|---|---|---|---|---|---|---|
| 7 | 6 | 5 | 4 | 3 | 2 | 1 | 0 | |
| TransportSpecific | | | | messageType | | | | 1 |
| reserved | | | | versionPTP | | | | 1 |
| messageLength | | | | | | | | 2 |
| domainNumber | | | | | | | | 1 |
| reserved | | | | | | | | 1 |
| flagField | | | | | | | | 8 |
| correctionField | | | | | | | | 4 |
| reserved | | | | | | | | 2 |
| sourcePortId | | | | | | | | 10 |
| sequenceId | | | | | | | | 2 |
| controlField | | | | | | | | 1 |
| logMessageInterval | | | | | | | | 1 |
| OriginTimeStamp THE CASE OF Sync or Delay_Req msg | | | | | | | | 10 |

PTP HEADER: rows from TransportSpecific through logMessageInterval

MESSAGE FIELD: OriginTimeStamp row

FIG. 4

| Messagetype | Value (hex) |
|---|---|
| Sync | 0 |
| Delay_Req | 1 |
| Pdelay_Req | 2 |
| Pdelay_Resp | 3 |
| Reserved | 4-7 |
| Follow_Up | 8 |
| Delay_Resp | 9 |
| Pdelay_Resp_Follow_Up | A |
| Announce | B |
| Signaling | C |
| Management | D |
| Reserved | E-F |

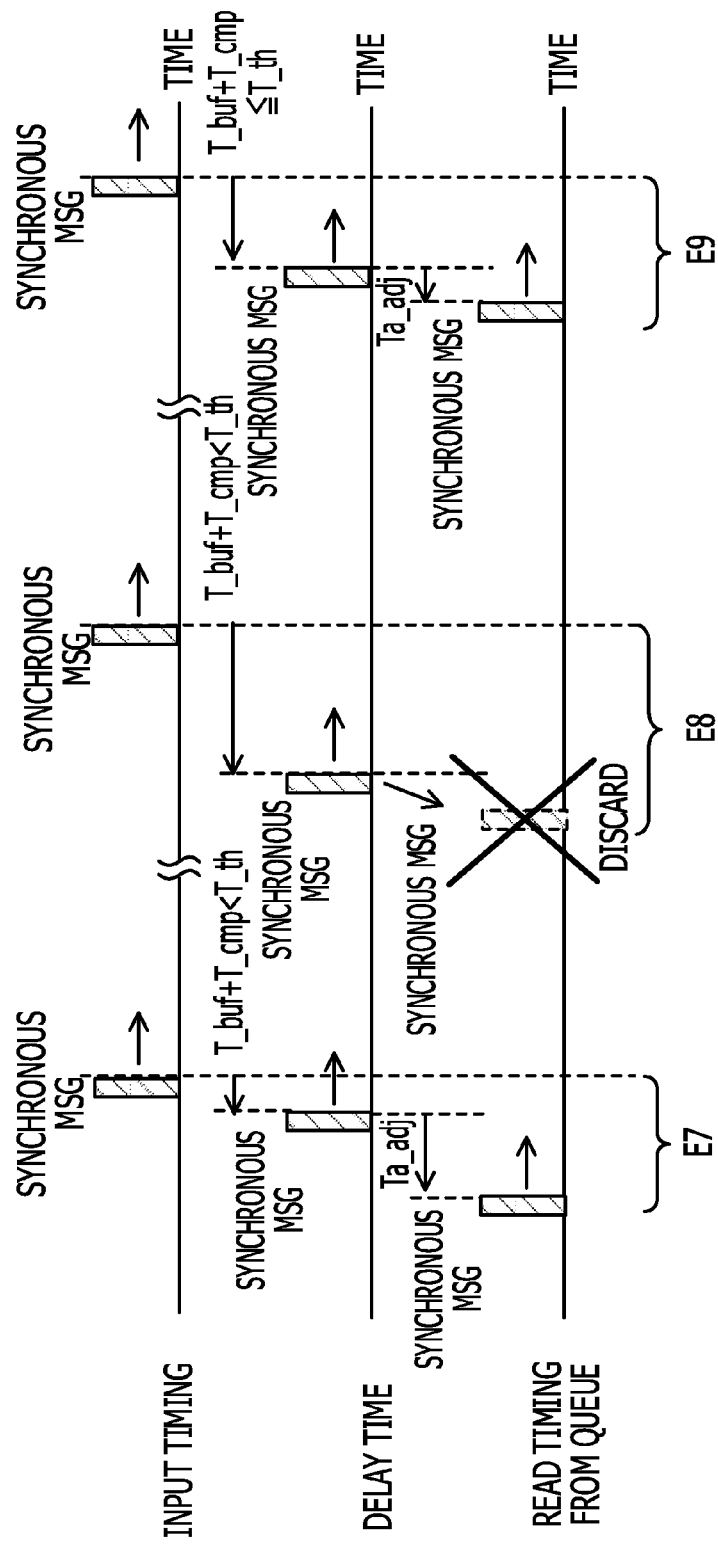

PACKET RELAY DEVICE AND PACKET TRANSMISSION DEVICE

CROSS-REFERENCE TO RELATED APPLICATION

This application is based upon and claims the benefit of priority from the prior Japanese Patent Application No. 2013-121129 filed on Jun. 7, 2013, the entire contents of which are incorporated herein by reference.

FIELD

The present disclosure relates to a packet relay device and a packet transmission device.

BACKGROUND

In a network of a time division multiplex (TDM) system, a plurality of transmission devices reproduces clocks from data signals which are transmitted continuously, and thereby performs mutual time synchronization or frequency synchronization. The standard specifications of synchronous transmission by a time division multiplex system include, for example, synchronous digital hierarchy (SDH) and synchronous optical network (SONET).

Along with the proliferation of the Internet, Internet Protocol (IP) compatible networks have spread and are replacing time division multiplex systems. In contrast to the time division multiplex systems, data signals in IP are transmitted packet by packet asynchronously, and thus time synchronization or frequency synchronization is performed by different systems.

The standard specifications of time synchronization or frequency synchronization system based on IP include network time protocol (NTP), IEEE1588-2008 (IEEE stands for the Institute of Electrical and Electronics Engineers, Inc.). The technology specified in the IEEE1588-2008 is supposed to enable time synchronization with an accuracy of microseconds and is expected to be applied to processing such as synchronous processing between base stations in a radio network.

In the case of IP, synchronous processing is performed in such a manner that a synchronous message including a time stamp (time information) is exchanged between a server system and a plurality of client devices, and thereby a transmission delay time therebetween is measured and offset amounts of frequency and time are estimated. The synchronous message is exchanged via packet relay devices (for example, a layer 2 switch and a router) which are provided in a network. In the present description, a packet including a synchronous message is simply denoted as a "synchronous message".

The packet relay devices relays not only a synchronous message but also a packet in other traffic similarly. For this reason, in the transmission processing of the packet relay devices, a conflict may occur between a synchronous message and another packet which is transmitted from the same port. In the case where a conflict occurs, even when a synchronous message is selected as a transmission candidate having a higher priority, if transmission processing (read from a queue) of another packet in conflict is already started, the synchronous message is kept on standby until the transmission processing is completed.

Therefore, a transmission delay time of a synchronous message in a network varies due to an effect from other traffic. This delay variation is called a packet delay variation (PDV) and could be a factor for reducing the accuracy of time synchronization and frequency synchronization.

On the other hand, for example, Japanese Laid-Open Patent Publication No. 2008-22131 discloses a technology that adjusts a delay in such a manner that a priority packet is stored in a priority queue not for a non-priority packet, and the priority queue is given a fixed delay time which is longer than or equal to the read processing time for a user packet with a maximum length. In addition, Japanese Laid-Open Patent Publication No. 2012-34224 discloses a technology that adjusts a delay in such a manner that a time synchronous packet is stored with a priority over other data packets and is transmitted with a delay time which is longer than or equal to the transmission time for a user packet with a maximum length.

SUMMARY

According to an aspect of the invention, a packet relay device includes: a first buffer configured to store a packet; and a processor coupled to the first buffer and configured to: calculate a delay time for reading from the first buffer based on a packet length and a packet interval of the packet which is inputted to the first buffer, and delay the packet according to the calculated delay time, the packet being read from the first buffer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a configuration diagram illustrating a configuration example of a synchronous message which is used in the sequence illustrated in FIG. 2.

FIG. 4 is a table illustrating an example of the message type of a synchronous message.

FIG. 30 is a time chart illustrating an example of an operation of a delay control unit.

DESCRIPTION OF EMBODIMENTS

Hereinafter, embodiments will be described with reference to the drawings.

While inventing the present embodiments, observations were made regarding a related art. Such observations include the following, for example.

In techniques of the related art, the packet processing systems of a packet relay device include a store-and-forward system in which packets are temporarily stored in a buffer to be processed and a cut-through system in which packets are processed in the order packets are received without using a buffer. In a packet relay device using a store-and-forward system, in addition to the queue of a packet transmission unit which controls quality of service (QoS), many buffers are provided in other processing units (for example, a selection processing unit of an output port for packets).

In the buffers, a delay problem occurs because of other user packets which have been stored before a synchronous message. That is, a synchronous message inputted in a buffer is not read from the buffer until other user packets, which have been already stored, are outputted, thereby creating a standby time until reading of the user packets is completed. Especially, when many buffers are provided or a user packet, which has been stored before the synchronous message, has a long (for example, 9600 (Byte) packet length (data volume), the effect of the standby time on PDV is serious.

For this problem, the technology disclosed in the above-mentioned Japanese Laid-Open Patent Publication No. 2008-22131 adjusts the overall delay based on a delay due to a conflict between packets which occurs in the queue of a packet transmission unit, but is not able to cope with a delay which occurs in the above-mentioned buffers. This is also the case with the technology disclosed in Japanese Laid-Open Patent Publication No. 2012-34224. Such a problem is not specific to an Ethernet (registered trademark) frame, and similarly occurs in another packet such as an IP packet.

Thus, the present disclosure has been made in view of the above-mentioned problem, and provides a packet relay device and a packet transmission device that reduce a packet delay variation effectively.

Figure 1:
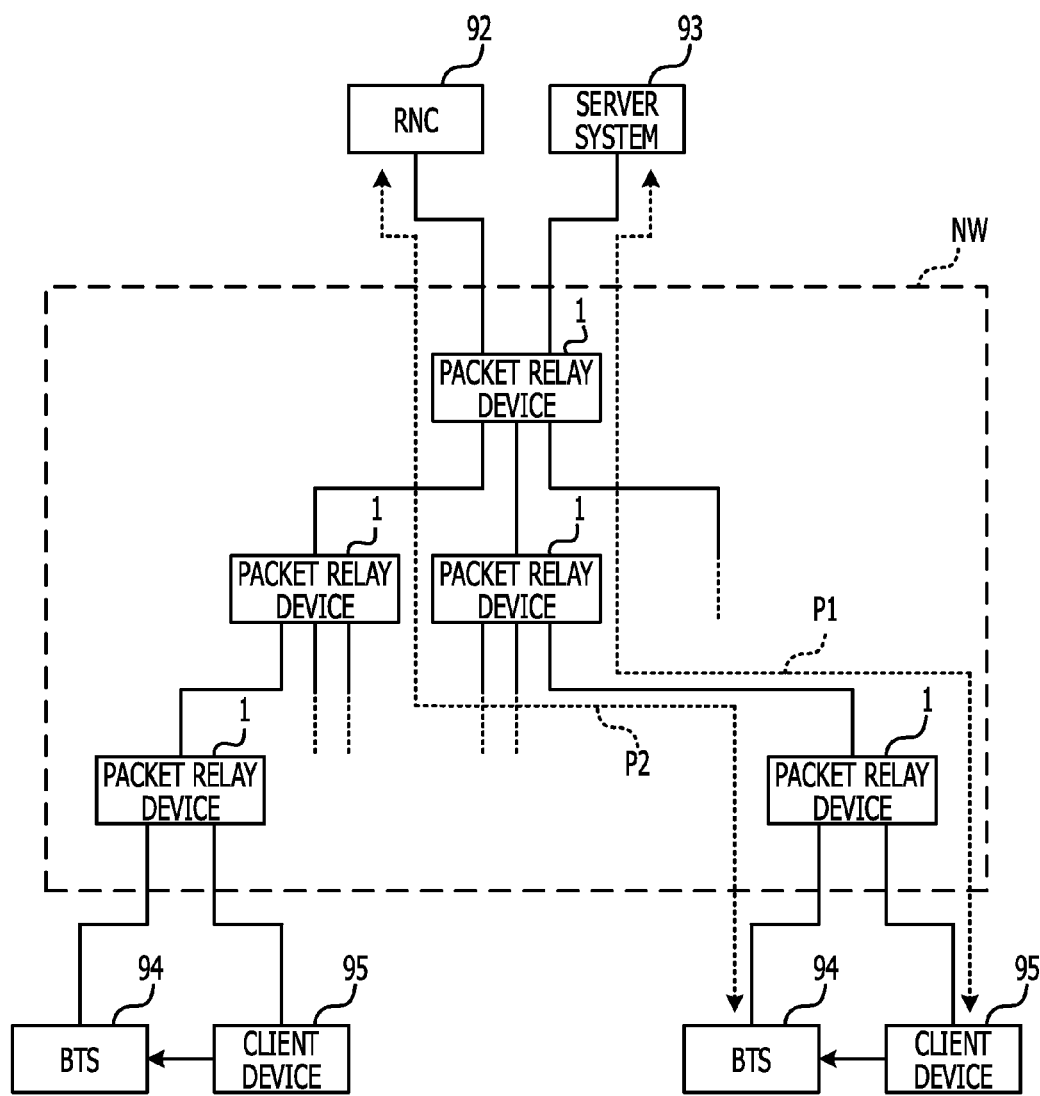
FIG. 1 is a configuration diagram illustrating an example of a network including a plurality of packet relay devices that relays a synchronous message.

FIG. 1 illustrates an example of a network including a plurality of packet relay devices that relays a synchronous message. This network is a radio network which is used for communication of a radio communication terminal such as a smartphone or a mobile phone.

A relay network NW includes a plurality of packet relay devices 1 and relays communication between a radio network controller (RNC) 92 and a plurality of radio base transceiver stations (BTS) 94. The RNC 92 performs send/receive connection control, terminating call control, and hand-over control by controlling the plurality of BTSs 94.

Each of the packet relay devices 1 is a relay device that relays a packet received from a device to another device according to its destination, and is, for example, a router (layer 3 switch) or a layer 2 switch. In the present description, a packet indicates a transmission unit for data (information) to be transmitted. Thus, the packet is not limited to an IP packet, and includes other protocol data units (PDU) such as Ethernet frames or asynchronous transfer mode (ATM) cells, for example.

In addition, the relay network NW also relays communication between a server system 93 and a plurality of client devices 95. Thus, communication (see symbol P1) between the server system 93 and the client devices 95, and communication (see symbol P2) between the RNC 92 and the BTSs 94 are performed via the relay network NW in common.

The server system 93 supplies a master clock which serves as a reference for the operation timing of the devices in the network. Each of the client devices 95 performs at least one of frequency synchronization and time synchronous by exchanging a synchronous message with the server system 93. Each client device 95 then supplies to the BTS 94 a clock or a time which is synchronized with the master clock. In this manner, the client devices 95 are synchronized with each other and are able to perform the above-mentioned hand-over control with high precision.

Figure 2:
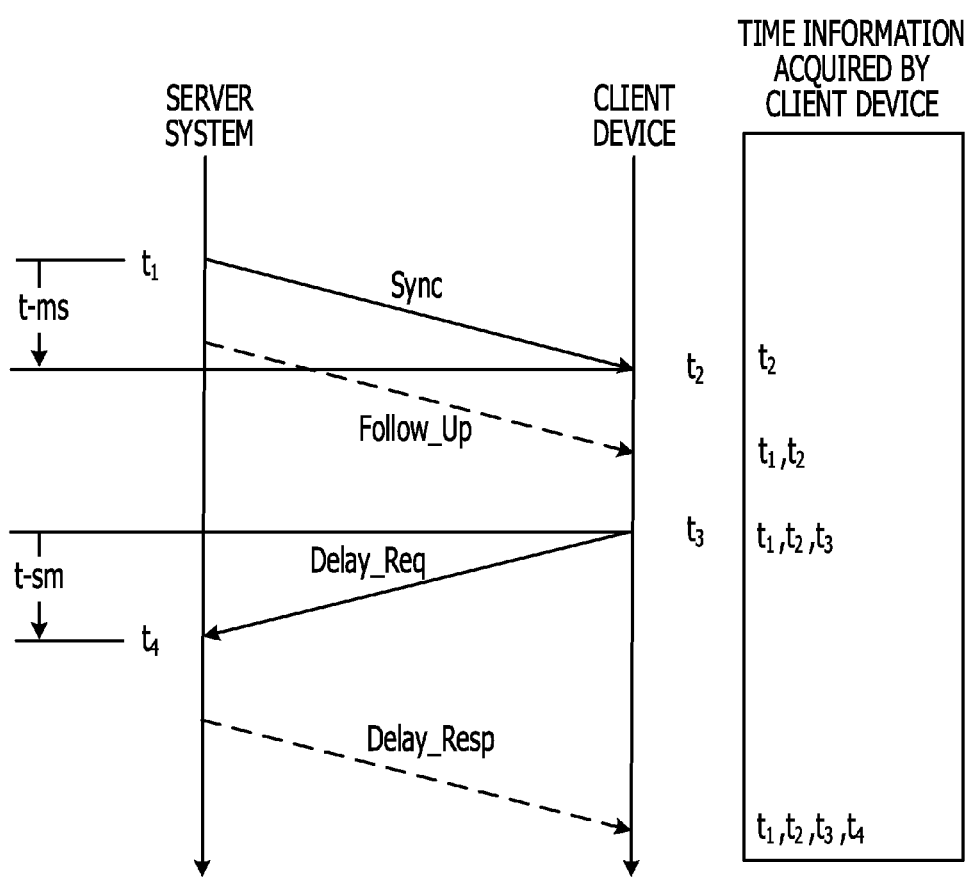
FIG. 2 is a ladder chart illustrating an example of a transmission and reception sequence of a synchronous message between a server system and a client device.

FIG. 2 illustrates an example of a transmission and reception sequence of a synchronous message between the server system 93 and the client device 95. FIG. 2 illustrates a sequence based on high precision time protocol (PTP) specified in the IEEE1588-2008. However, without being limited to this, another sequence may be adopted.

FIG. 3 illustrates a configuration example of a synchronous message which is used in the sequence illustrated in FIG. 2. The synchronous message includes a PTP header and a message field. The PTP header stores "messageType"

information that indicates a message type. The details of "messageType" information are as defined in the table illustrated in FIG. 4. For example, when the "messageType" information indicates a value of "0", the synchronous message is "Sync".

In the sequence of this example, four types of synchronous messages, "Sync", "Follow_Up", "Delay_Req", and "Delay_Resp" are used. The client device 95 acquires time information t1 to t4 called time stamp by exchanging each synchronous message with the server system 93. The time information t1 to t4 are stored in the message field illustrated in FIG. 3 (see the "OriginTimeStamp" information). The time information t1 to t4 to be acquired by the client device 95 is illustrated stepwise on the right side of FIG. 2.

First, the server system 93 transmits "Sync" to the client device 95, the Sync including the time information t1 which indicates the transmission time. The client device 95 then receives "Sync" and acquires the time information t2 which indicates the time of the reception. In addition, in the case where the transmission time t1 may not be stored in the Sync message, the server system 93 transmits "Follow_Up" to the client device 95, the Follow_Up including the transmission time information t1 of the Sync. In this manner, the client device 95 acquires the transmission time t1 and the reception time t2 of the "Sync".

Next, the client device 95 transmits "Delay_Req" to the server system 93, the Delay_Req including the time information t3 which indicates the transmission time. The server system 93 then receives "Delay_Req" and transmits "Delay_Resp" to the client device 95, the Delay_Resp including the time information t4 which indicates the time of the reception. In this manner, the client device 95 acquires the transmission time t3 and the reception time t4 of the "Delay_Req".

Thus, the client device 95 is able to obtain a transmission delay time t-ms in the transmission direction from the server system 93 to the client device 95 by calculating t2−t1. In addition, the client device 95 is able to obtain a transmission delay time t-sm in the transmission direction from the client device 95 to the server system 93 by calculating t4−t3. Here, when it is assumed that the transmission delay times in both transmission directions are equal, the time offset value between the server system 93 and the client device 95 is obtained by calculating $\{(t-ms)+(t-sm)\}/2$.

Figure 5:
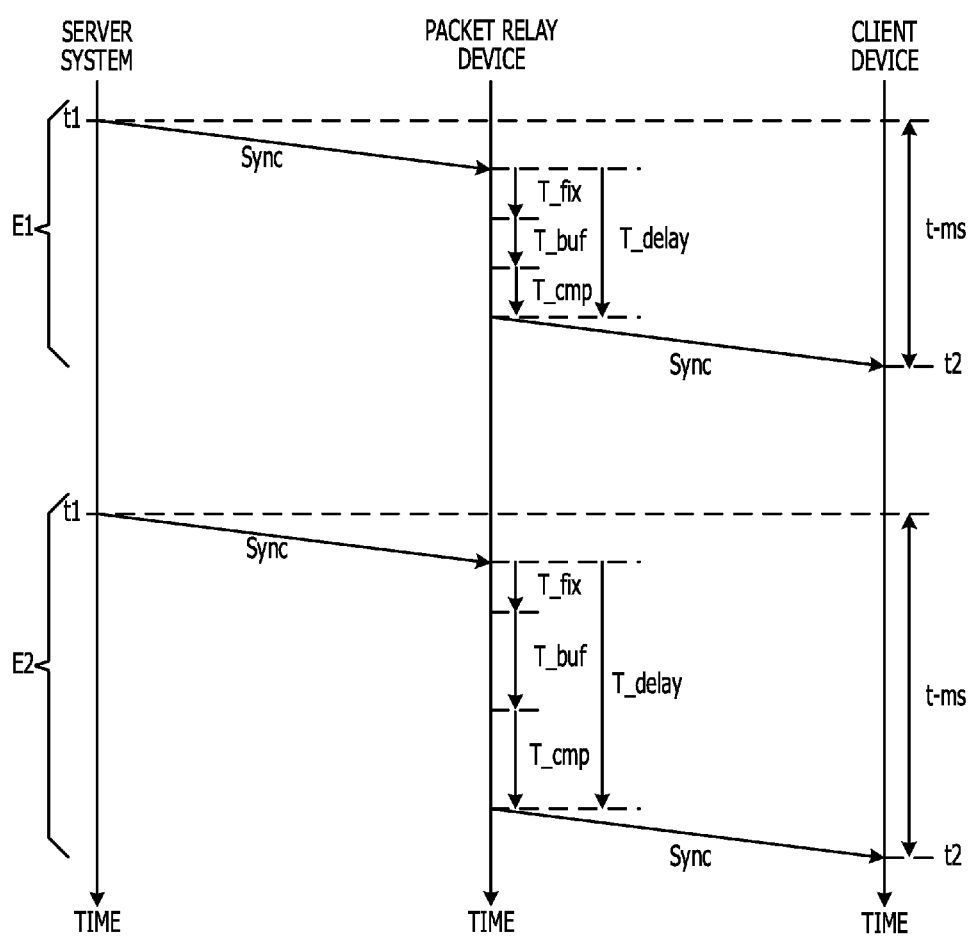
FIG. 5 is a ladder chart illustrating a delay time which occurs in a packet relay device.

The above-mentioned transmission delay times t-ms and t-sm include a delay time which occurs in the packet relay device 1. FIG. 5 illustrates a delay time which occurs in the packet relay device 1 by way of an example in which the above-mentioned "Sync" is transmitted. FIG. 5 illustrates the case where "Sync" is transmitted only via a packet relay device 1, however, the following description similarly applies to the case where transmission is made via a plurality of packet relay devices 1.

A delay time T_delay in the packet relay device 1 includes a fixed delay time T_fix, a read delay time T_buf, and a conflict delay time T_cmp. The fixed delay time T_fix is a delay time that occurs regularly due to predetermined internal processing. The read delay time T_buf is a standby time which occurs due to reading of other packets preceding the synchronous message ("Sync") which are stored in a buffer for internal processing. The conflict delay time T_cmp is a standby time which occurs due to a conflict between transfer processing of "Sync" and other packets.

As described above, the relay packet relay device 1 relays not only a synchronous message transmitted and received between the server system 93 and the client device 95 but also other packets transmitted and received between the RNC 92 and the BTSs 94. For this reason, there may be a case where a synchronous message is set on standby in the buffer for internal processing due to other packets inputted from the same port, and in this case, the read delay time T_buf occurs. Furthermore, there may be a case where a conflict occurs between a synchronous message and other packets transmitted from the same port, and thus the synchronous message is set on standby for transmission, and in this case, the conflict delay time T_cmp occurs. In the following description, a packet other than a synchronous message is denoted as a "user packet".

The read delay time T_buf and the conflict delay time T_cmp vary according to traffic conditions of user packets which are transmitted in the relay network NW. For example, the read delay time T_buf and the conflict delay time T_cmp in the example indicated by symbol E2 are longer than the read delay time T_buf and the conflict delay time T_cmp of in the example indicated by symbol E1. Therefore, the transmission delay time t-ms in the example indicated by symbol E2 is also longer than that in the example indicated by symbol E1.

Figure 6:
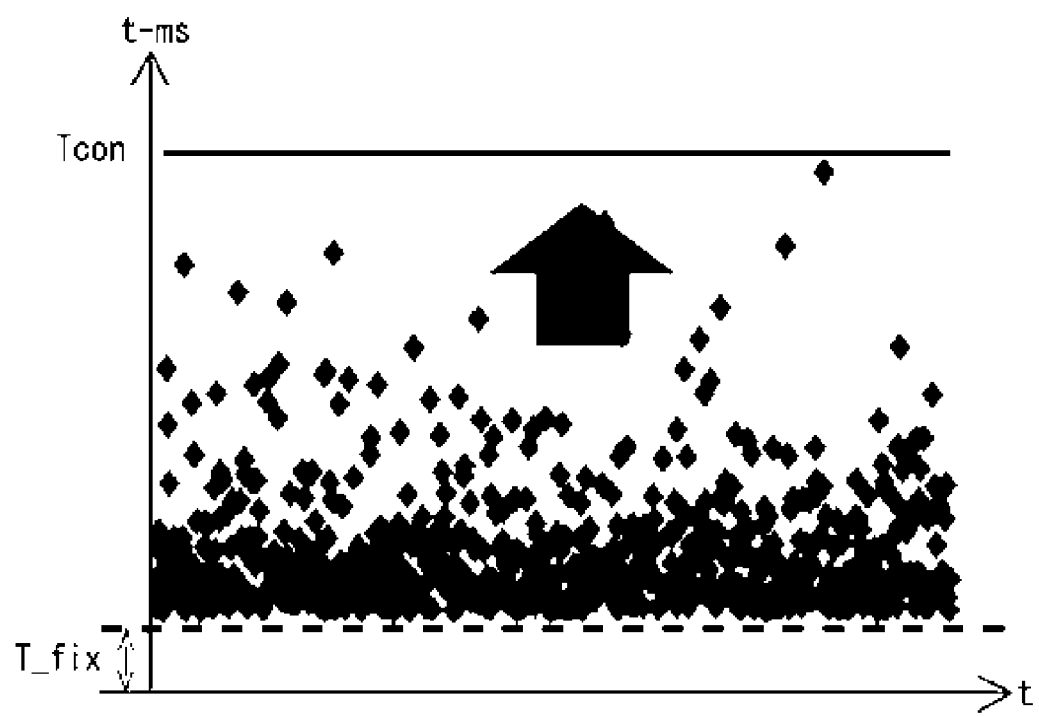
FIG. 6 is a graph illustrating an example of distribution of transmission delay time.

FIG. 6 depicts a graph illustrating an example of distribution of the transmission delay time t-ms. In FIG. 6, the horizontal axis indicates elapsed time and the vertical axis indicates transmission delay time t-ms. In FIG. 6, a delay, which occurs when no user packet is transmitted in the relay network NW, is the above-described fixed delay time T_fix as indicated by the dashed line.

The degree of variation (degree of discrete) in the transmission delay time t-ms increases as the amount of traffic of user packets increases. This is because the read delay time T_buf and the conflict delay time T_cmp increase as the amount of traffic of user packets increases.

The variation in the transmission delay time t-ms has an effect on the accuracy of synchronization of the client device 95 as a variation in packet delay. In order to increase the accuracy of synchronization, it is sufficient that the transmission delay time t-ms is made to have a fixed value, Tcon by adjusting the relay delay T_delay of a synchronous message. So far, a description has been given by way of an example of the transmission delay time t-ms in one transmission direction, however, a variation similarly occurs in the transmission delay time t-ms in the other transmission direction.

Figure 7:
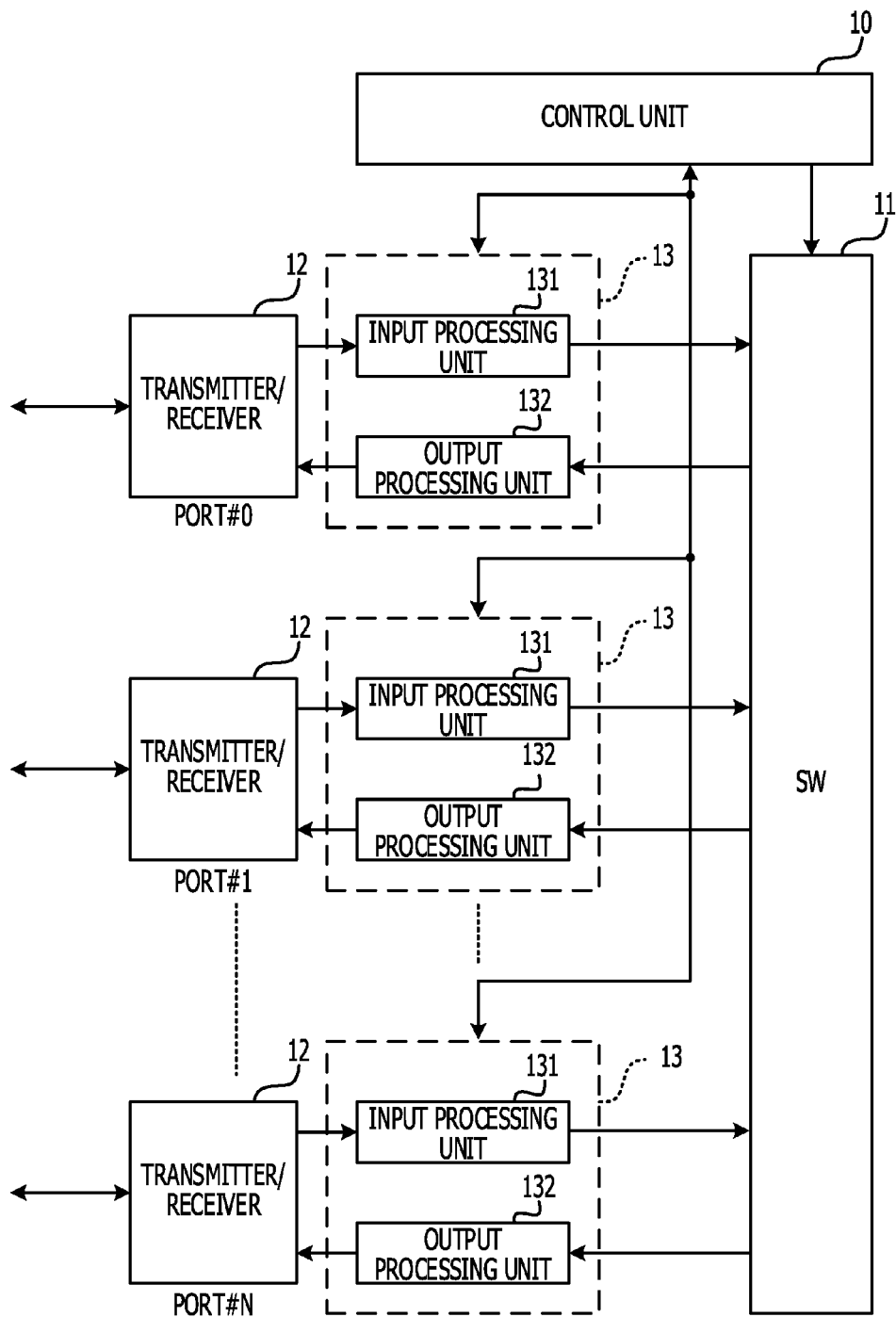
FIG. 7 is a configuration diagram illustrating the functional configuration of a packet relay device according to an embodiment.

Hereinafter, the mechanism of occurrence of the read delay time T_buf and the conflict delay time T_cmp will be described. FIG. 7 illustrates the functional configuration of the packet relay device 1 according to an embodiment. The packet relay device 1 includes a control unit 10, a switch unit 11, a plurality of transmitters/receivers 12, and a plurality of transmission processing units 13. The transmission processing units 13 are provided correspondingly to the respective transmitters/receivers 12, and each include an input processing unit 131 and an output processing unit 132.

The transmitters/receivers 12 are each an optical device that transmits and receives optical signals, for example, and correspond to respective ports #0 to #N. Each of the transmitters/receivers 12 is connected to an external device via an optical fiber or the like to transmit and receive packets to and from the device. The input processing unit 131 processes a packet which is received via one of the ports #0 to #N. The input processing unit 131 determines one of the ports #0 to #N as a transfer destination based on, for example, the address information included in a packet, assigns an internal header to a packet, and outputs the packet to the switch unit 11, the internal header including a transfer destination port number.

The switch unit 11 refers to the internal header and outputs the packet to an output processing unit 132 which corresponds to one of the other ports #0 to #N, according to the transfer destination port number. The output processing units 132 each processes a packet to be transmitted via one of the ports #0 to #N. The output processing units 132 each outputs a packet to be transmitted to one of the ports #0 to #N successively so as to satisfy QoS. That is, the output processing units 132 each function as a packet transmission device that transmits a packet.

The control unit 10 is an arithmetic processing unit such as a central processing unit (CPU), for example, and controls the entire device. The control unit 10 performs setting processing for the transmission processing units 13 and the switch unit 11 and reads information from the transmission processing units 13 and the switch unit 11 according to an operation from an external terminal device such as a computer, for example.

Figure 8:
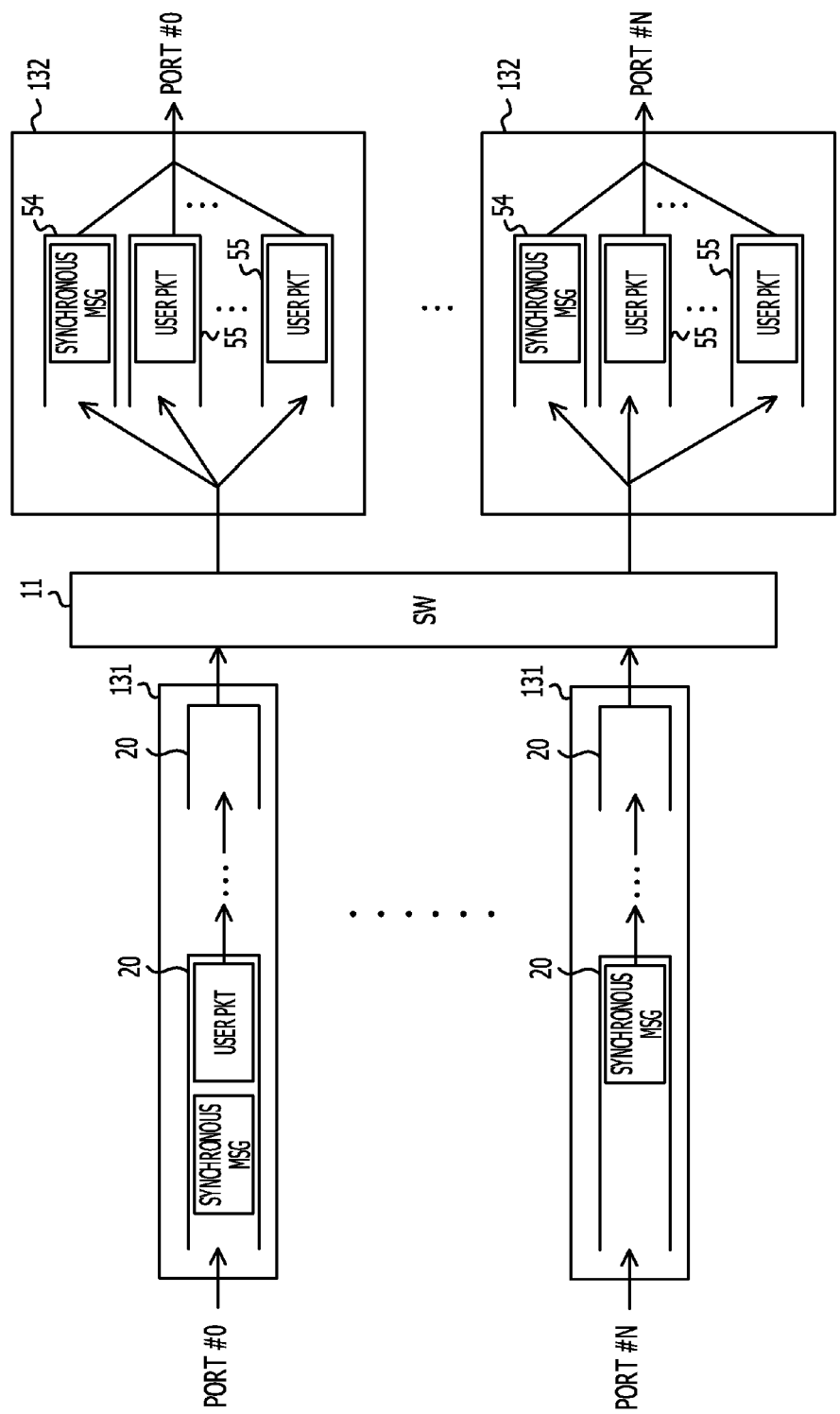
FIG. 8 is a configuration diagram illustrating paths for packets in the packet relay device.

FIG. 8 is a configuration diagram illustrating paths for packets in the packet relay device 1. More specifically, FIG. 8 illustrates a plurality of buffers 20 and a plurality of queues 54, 55 provided on the paths for packets.

The packets inputted from the ports #0 to #N are stored in the plurality of buffers 20 in the input processing units 131. The plurality of buffers 20 stores packets temporarily, for example, in order to perform processing of assigning an internal header.

In the example illustrated in FIG. 8, only a synchronous message (see "synchronization msg") is stored in the buffer 20 of the input processing unit 131 at the port #N. Thus, the synchronous message is read from the buffer 20 without delay.

On the other hand, in the buffer 20 of the input processing unit 131 at the port #0, a user packet (see "user PKT") is stored preceding a synchronous message. For this reason, the synchronous message is kept on standby until the user packet is outputted, and thus reading is delayed. Especially, when a user packet has a packet length of, for example, 9600 (Byte) like a long packet (what is called a jumbo frame), delay in reading the synchronous message increases. The delay in reading the synchronous message increases as the number of buffers increases and delay is accumulated. In this manner, the above-mentioned read delay time T_buf occurs.

A packet, which is read from the buffers 20, is outputted to the output processing units 132 at one of the ports #0 to #N as the destination via the switch unit 11. In order to perform transmission processing to satisfy QoS, each output processing unit 132 is provided with a plurality of queues 54, 55 to store priority packets and non-priority packets separately which are divided from packets on standby for transmission. The priority queue 54 stores a priority packet such as a synchronous message, and the non-priority queues 55 each store a non-priority packet such as a user packet.

In the example illustrated in FIG. 8, in the output processing unit 132 at the port #0, a synchronous message is stored in the priority queue 54 and user packets are stored in the non-priority queues 55. The synchronous message is preferentially read from the priority queue 54 and transmitted over a user packet which is a non-priority packet.

However, in the case where one of the user packets is being read from a queue 55 when a synchronous message is inputted to the queue 54, the synchronous message is kept on standby until reading of the user packet is completed, and thus the above-mentioned conflict delay time T_cmp occurs. That is, the conflict delay time T_cmp is a standby delay time caused by a non-priority packet which is being read.

In this manner, PDV in the packet relay device 1 is caused by two delay times (T_buf, T_cmp). For example, the technology (hereinafter denoted as a "conventional example") disclosed in Japanese Laid-Open Patent Publication No. 2008-22131 adjusts the relay delay T_delay based on only the conflict delay time T_cmp out of the two delay times.

Figure 9:
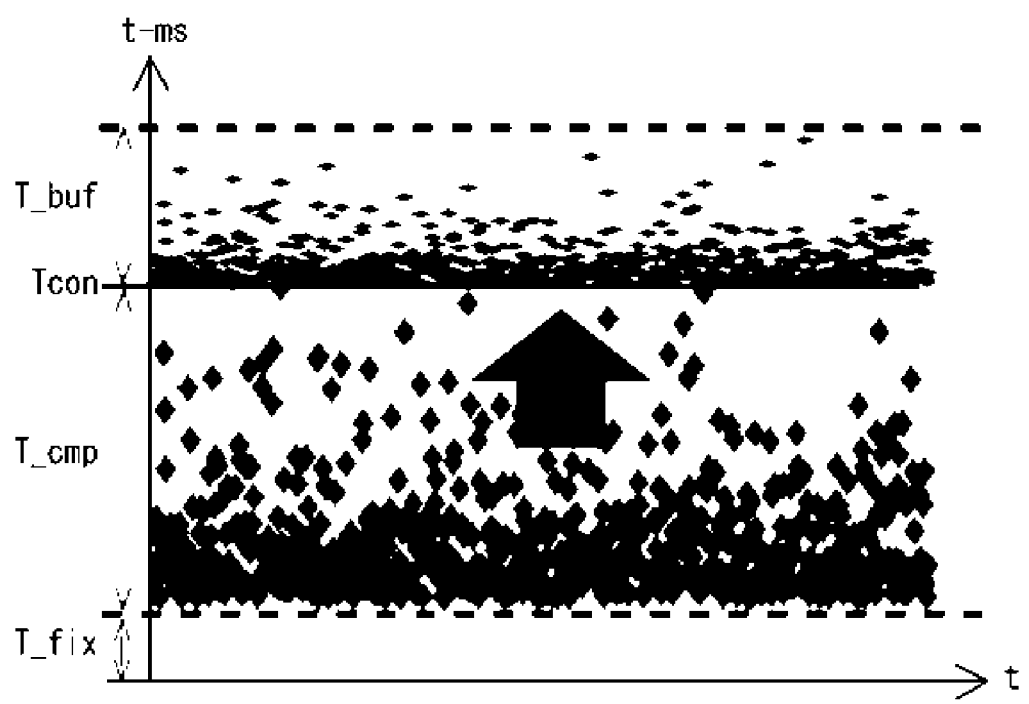
FIG. 9 is a graph illustrating an example of distribution of transmission delay time in a conventional example.

FIG. 9 is a graph illustrating an example of distribution of transmission delay time t–ms in the conventional example. In the conventional example, the conflict delay time T_cmp is reduced in variation and is adjusted to a fixed value Tcon, but variation in the read delay time T_buf is not reduced, and thus the transmission delay time t–ms varies. Therefore, it is difficult to improve the accuracy of synchronization in the conventional example. The example illustrated in FIG. 9 indicates the characteristic for the case of a packet relay device using a store-and-forward system, and is not applied to the case of a packet relay device using a cut-through system which is not provided with the buffer 20.

On the other hand, the packet relay device 1 according to an embodiment calculates a read delay time for the buffer 20 based on the packet lengths and the packet interval of the packets which are inputted to the buffer 20, and delays the read packets according to the delay time in reading, thereby reducing PDV.

(First Embodiment)

Figure 10:
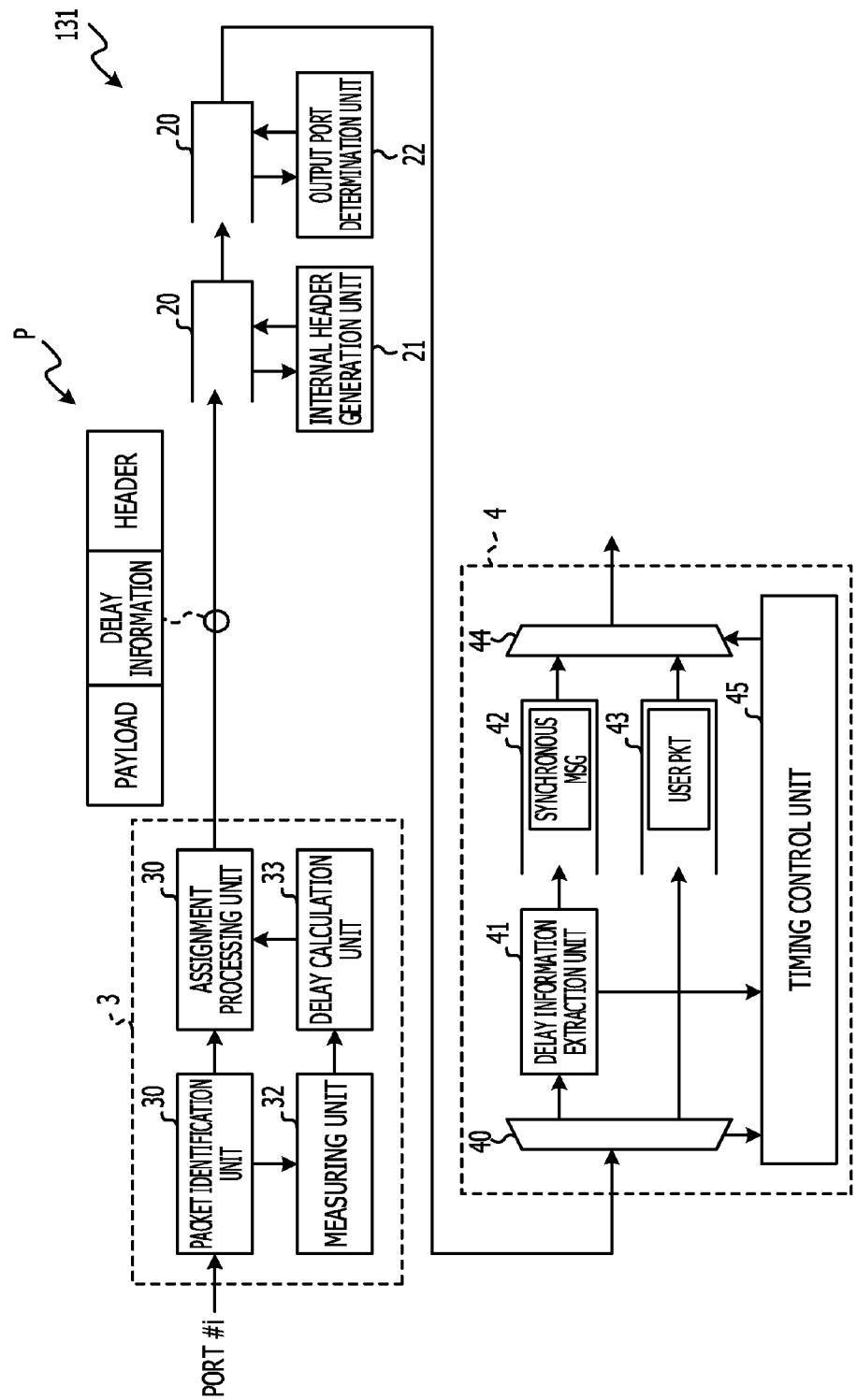
FIG. 10 is a configuration diagram illustrating the functional configuration of an input processing unit according to a first embodiment.

FIG. 10 is a configuration diagram illustrating the functional configuration of an input processing unit 131 according to a first embodiment. The input processing unit 131 has a delay information generation unit 3, a plurality of buffers 20, an internal header generation unit 21, an output port determination unit 22, and a delay control unit 4. Two buffers 20 are illustrated in FIG. 10. However, without being limited to this, a number of buffers 20 are provided, the number corresponding to predetermined packet processing.

The delay information generation unit 3 generates delay information which indicates the read delay time T_buff for a synchronous message. The delay information generation unit 3 has a packet identification unit 30, an assignment processing unit 31, a measuring unit 32, and a delay calculation unit 33. The packet identification unit 30 identifies a synchronous message and a user packet, and informs the assignment processing unit 31 and the measuring unit 32 of the type of the identified packet.

Figure 11:
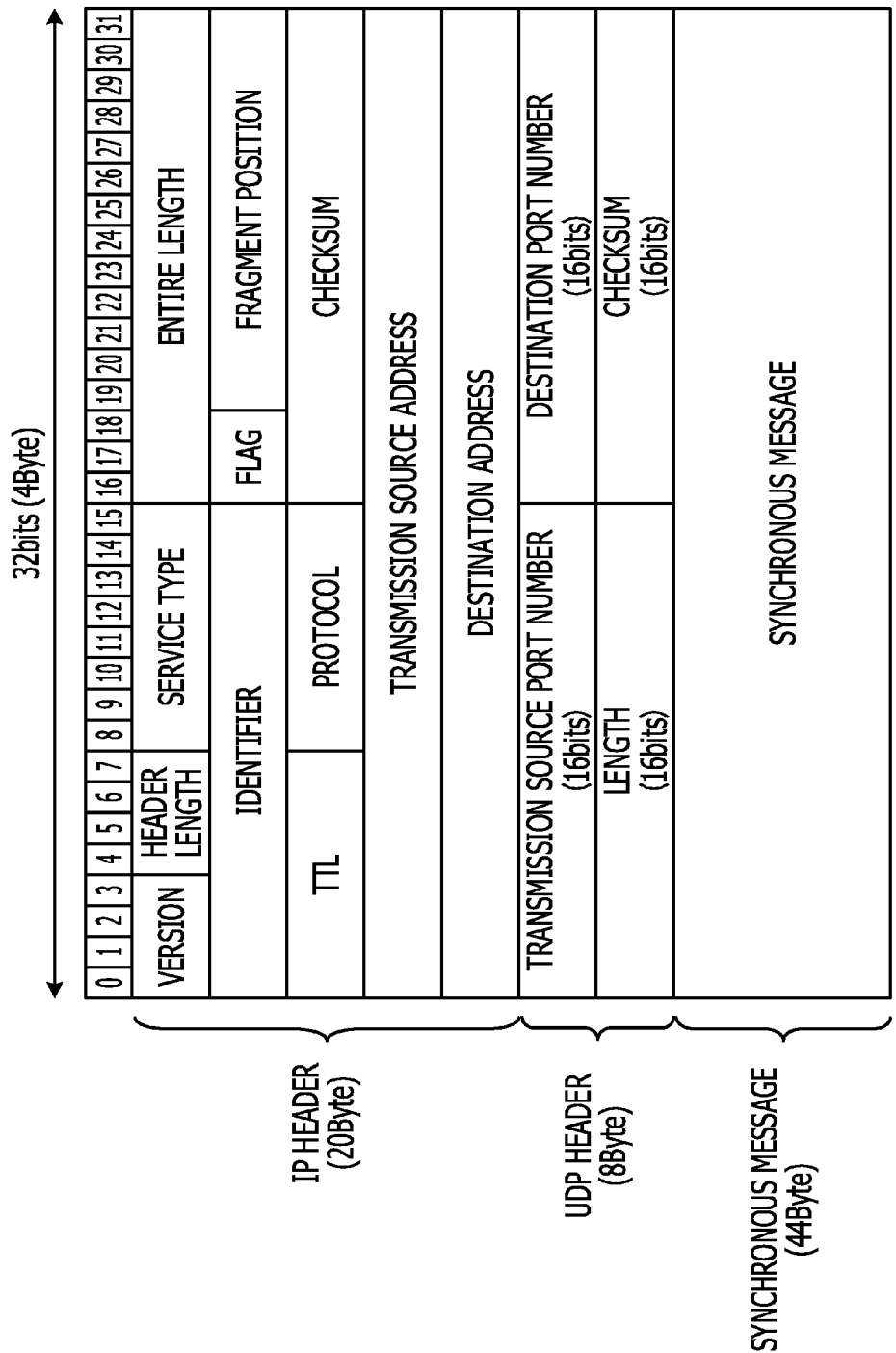
FIG. 11 is a configuration diagram illustrating an example of a configuration of a packet of layer 3 including a synchronous message.

FIG. 11 illustrates an example of a configuration of a packet of layer 3 including a synchronous message. The packet includes an IP header, a user datagram protocol (UDP) header, and a synchronous message. The configuration example of a synchronous message is as described with reference to FIG. 3.

The IP header includes the following information: version, header length, service type, entire length, Time ToLive (TTL), identifier, flag, fragment position, protocol, checksum, transmission source address, and destination address. The UDP header includes the following information: a transmission source port number, a destination port number, a length, and a checksum. The priority of a packet is determined by referring to the service type information in the IP header, for example. The identifier, the flag, and the fragment position in the IP header are used for fragment processing in the case where a packet is divided into multiple fragments.

Figure 12:
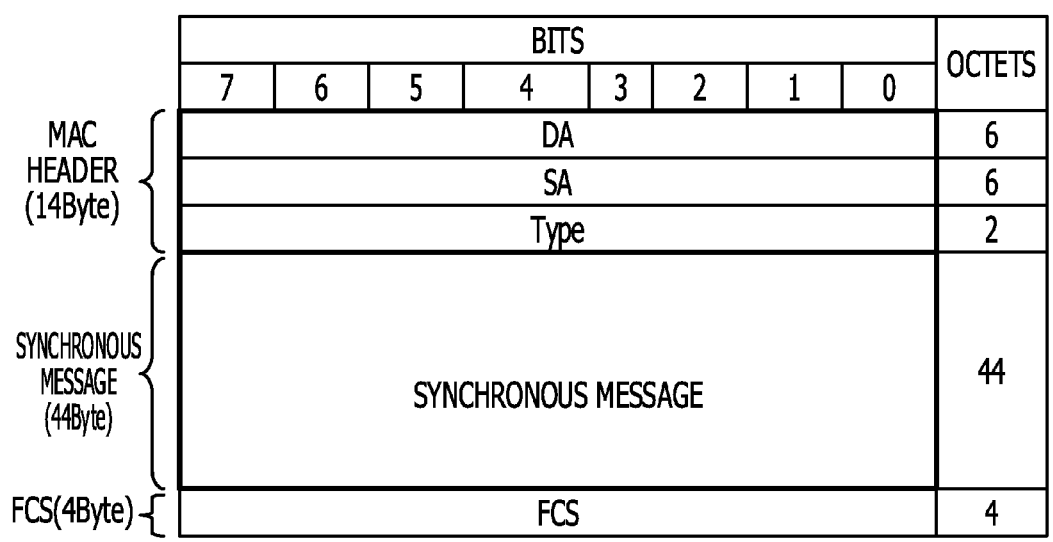
FIG. 12 is a configuration diagram illustrating an example of a configuration of a frame of layer 2 including a synchronous message.

A synchronous message may not be limited to a packet of the layer 3, and may be transferred as a frame of the layer 2. FIG. 12 illustrates an example of a configuration of a frame of the layer 2 including a synchronous message.

The frame includes a media access control (MAC) header, a synchronous message, and a frame check sequence (FCS). The MAC header includes a destination address (DA) which is a destination of address, a source address (SA) which is a transmission source address, and Type which indicates a protocol. The FCS is a check code for checking the normality of data in a frame.

The packet identification unit 30 identifies the type of a packet by detecting a synchronous message in the packet illustrated in FIGS. 11 and 12. The measuring unit 32 measures the packet lengths and the packet interval of the packets which are inputted to the buffer 20. The delay calculation unit 33 calculates a read delay time T_buf for the buffer 20 for synchronous messages based on the packet lengths and the packet interval which have been measured by the measuring unit 32. In the following, a technique for calculating the read delay time T_buf will be described with reference to FIGS. 13 to 15.

Figure 13:
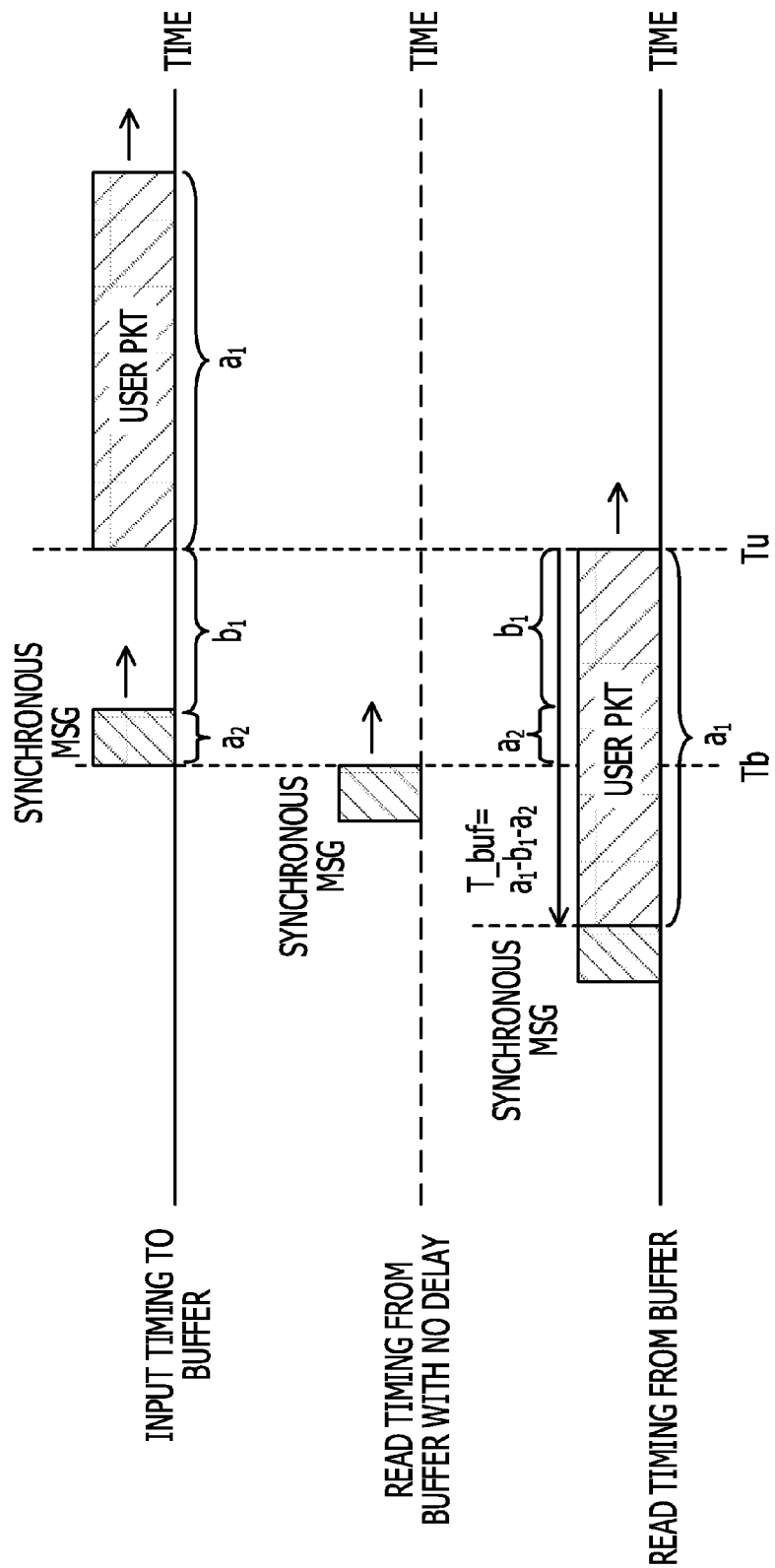
FIG. 13 is a time chart illustrating delay of read processing in a buffer.

FIG. 13 is a time chart illustrating delay of read processing in the buffer 20. In FIG. 13, let the packet length of a user packet be a1 (Byte), let the packet length of a synchronous message be a2 (Byte), and let the packet interval between the user packet and the synchronous message be b1 (Byte). FIG. 13 illustrates a timing for inputting a packet to the buffer 20, a timing for reading a synchronous message from the buffer 20 with no delay, and a timing for reading from the buffer 20.

When a user packet is inputted to the buffer 20 preceding a synchronous message, the user packet is read from the buffer 20 preceding the synchronous message. When no other packet is inputted to the buffer 20 preceding the user packet, timing Tu for outputting a user packet is the timing immediately after the input to the buffer 20 is completed.

On the other hand, when it is assumed that no other packet is inputted to the buffer 20 preceding a synchronous message, timing Td for outputting a user packet is the timing immediately after the input to the buffer 20 is completed. That is, the output timing Td is the timing for reading a synchronous message with no delay. When it is assumed that reading of a synchronous message starts immediately after completion of reading a user packet, the read delay time T_buf for a synchronous message is the difference between the above-mentioned output timing Tu and output timing Td, and thus is calculated by the following Expression (1).

$$T\_buf = a_1 - b_1 - a_2 \quad (1)$$

Figure 14:
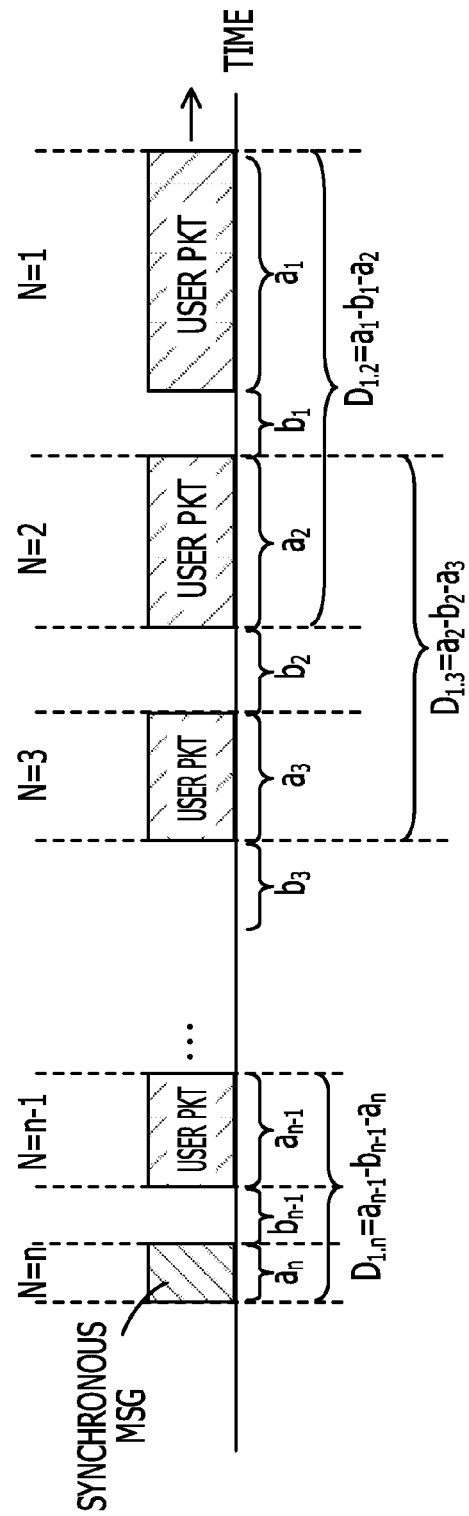
FIG. 14 is a time chart illustrating delay of read processing with a plurality of user packets.

However, the number of user packets inputted to the buffer 20 preceding a synchronous message may not be one, and it is preferable to generalize Expression (1) by assuming the case where multiple user packets are stored. FIG. 14 is a time chart illustrating delay of read processing with a plurality of user packets. In FIG. 14, let the packet length of the nth packet from the head be $a_n$ (Byte) and let the packet interval between the nth packet and the (n+1)th packet from the head be $b_n$ (Byte).

In FIG. 14, $D_{1,n}$ is the read delay time for the nth packet from the head which is stored in the first buffer out of the plurality of buffers 20. $D_{1,n}$ is generalized as in the following Expression (2) based on Expression (1).

$$D_{1,n} = a_{n-1} - b_{n-1} - a_n \quad (2)$$

Therefore, the read delay $D_{1,n}$ for each packet is calculated based on Expression (2) by measuring the packet lengths and the packet interval of all the packets inputted to the buffer 20. The read delay for a synchronous message is calculated as the sum of the read delay $D_{1,n}$ for all the preceding user packets. Consequently, the read delay $D_1$ for a synchronous message in the first buffer 20 is calculated by the following Expression (3).

$$D_1 = D_{1,2} + D_{1,3} + \ldots + D_{1,n} (D_{1,n} > 0) \quad (3)$$

The read delay times $D_2, D_3, \ldots, D_M$ (M is the total number of buffers) in the second and after buffers 20 are also calculated by an expression similar to Expression (3). However, in the second and after buffers 20, the packet interval bn may change after a packet passes through a buffer 20 in a preceding stage, and thus the packet interval bn is preferably corrected to calculate the read delay times $D_2, D_3, \ldots, D_M$. In the case where $D_{1,n} \leq 0$, it indicates that delay does not occur and the sum of the delay so far is 0, and thus $D_1 = 0$.

Figure 15:
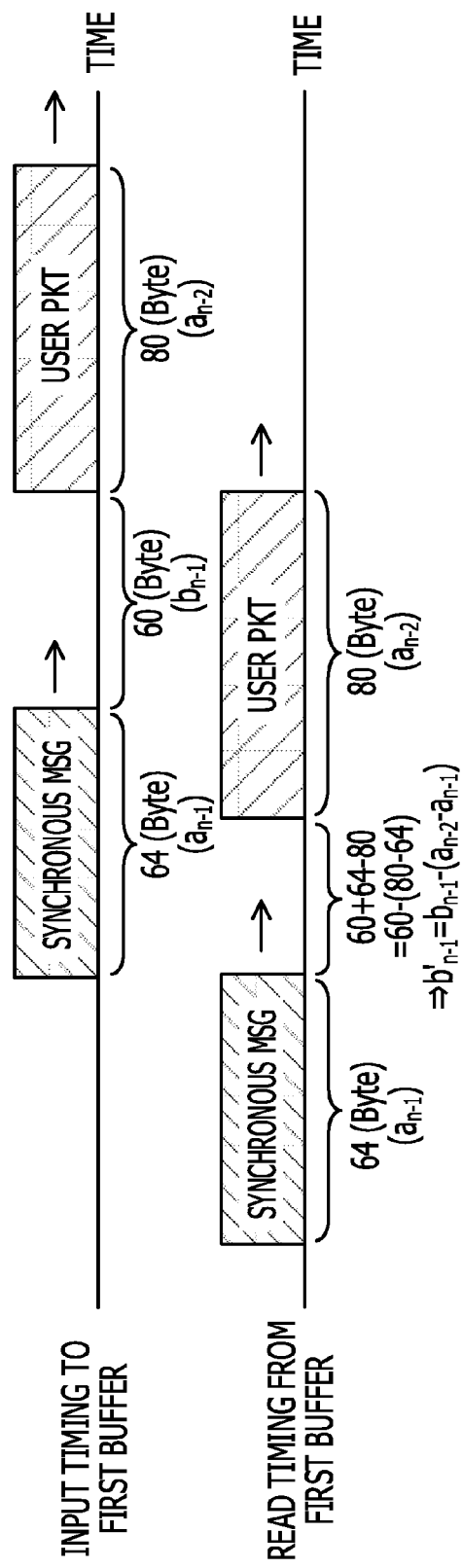
FIG. 15 is a time chart illustrating a change of a packet interval.

FIG. 15 is a time chart illustrating a change of a packet interval. In this example, it is assumed that after a user packet of 80 (Byte) is inputted in the first buffer 20, a synchronous message of 64 (Byte) is inputted with a packet interval of 60 (Byte). For the purpose of generalization, let the packet length of a user packet be $a_{n-2}$ (Byte), let the packet length of a synchronous message be $a_{n-2}$ (Byte), and let the packet interval between the user packet and the synchronous message be $b_{n-1}$ (Byte). That is, $a_{n-2}=80$, $a_{n-2}=60$, and $b_{n-1}=60$.

When it is assumed that a timing for reading each packet from the buffer 20 is immediately after completion of an input of the packet, the packet interval $b'_{n-1}$ after the reading from the buffer is the value obtained by subtracting the packet length of the user packet from the sum of the packet length of the synchronous message and the packet interval. That is, the packet interval $b'_{n-1}$ is obtained by $60+64-80=60-(80-64)$, and thus is generalized by the following Expression (4).

$$b'_{n-1} = b_{n-1} - (a_{n-2} - a_{n-1}) \quad (4)$$

Thus, the read delay times $D_2, D_3, \ldots, D_M$ in the second and after buffers 20 are calculated by Expression (3) after the packet interval $b_n$ is corrected by Expression (4). The read delay time T_buf for the synchronous message is the sum of the read delay times $D_1, D_2, D_3, \ldots, D_M$ for all the buffers 20, and thus is calculated by the following Expression (5).

$$T\_buf = D_1 + D_2 + D_3 + \ldots + D_M \quad (5)$$

In this manner, calculation of the read delay time T_buf for the synchronous message by use of the packet lengths and the packet interval allows the circuit configuration to be simplified. For example, in contrast to the above-described calculation technique, the following calculation technique may be adopted: an input time when a packet is inputted and an output time when a packet is outputted are measured for each buffer 20, and the read delay time T_buf is calculated from the difference between the input time and the output time. However, when this technique is used, it is desired that a time, which is clocked by a time clock circuit, be synchronized between a plurality of transmission processing units 13, thereby causing a disadvantage such as a complicated circuit configuration and an increase in circuit size.

Referring to FIG. 10 again, the assignment processing unit 31 assigns delay information to a synchronous message, the delay information indicating the read delay time T_buf which is calculated by the delay calculation unit 33. The delay information may be inserted, for example, between the header and the payload of each packet as indicated by symbol P. It is to be noted that the assignment processing unit 31 does not assign delay information to a user packet.

A packet outputted from the assignment processing unit 31 is inputted to the first buffer 20 to be processed by the internal header generation unit 21. The internal header generation unit 21 assigns an internal header to each packet, the internal header being used for processing such as transfer processing in the packet relay device 1.

Next, the packet is inputted to the second buffer 20 to be processed by the output port determination unit 22. The output port determination unit 22 determines one of the ports #0 to #N, that is, the output destination of the packet according to the destination information (for example, DA illustrated in FIG. 12) of the packet. The output port determination unit 22 writes output destination information in part of the above-mentioned internal header, for example, the output destination information indicating one of the ports #0 to #N which is determined as an output destination. The switch unit 11 refers to the output destination information and outputs the packet to the output processing unit 132 of corresponding one of the ports #0 to #N.

Next, the packet is inputted to the delay control unit 4. The delay control unit 4 acquires the read delay time T_buf by extracting delay information from the synchronous message, and delays the packet which is read from the buffer 20, according to the read delay time T_buf.

The delay control unit 4 has a distribution unit 40, a delay information extraction unit 41, a first queue 42 for synchronous messages, a second queue 43 for packets such as user packets other than synchronous messages, a read processing unit 44, and a timing control unit 45. The first queue 42 and the second queue 43 store synchronous messages (priority packets) and other packets such as user packets (non-priority packets) separately which are divided from the packets which are read from the buffer.

The distribution unit 40 identifies the packet inputted from the buffer 20. When the packet is a synchronous message, the distribution unit 40 outputs the packet to the first queue 42, and when the packet is not a synchronous message, the distribution unit 40 outputs the packet to the second queue 43. Each time a packet arrives from the buffer 20, the distribution unit 40 outputs packet information to the timing control unit 45, the packet information including the type information (synchronous message or other) of the arrived packet, the packet length, the arrival timing, and the arrival order.

The delay information extraction unit 41 is provided between the distribution unit 40 and the first queue 42 so as to extract delay information from a synchronous message and to output the delay information to the timing control unit 45. The delay information extraction unit 41 may delete the delay information from the synchronous message after the delay information is extracted.

The read processing unit 44 selects one of the first queue 42 and the second queue 43, and reads a packet from the selected queue. The read packet is inputted to the switch unit 11.

The timing control unit 45 informs the read processing unit 44 of selected one of the first queue 42 and the second queue 43 to be read for a packet and a timing for reading the packet from the selected queue. The timing control unit 45 determines a timing for reading the synchronous message according to the read delay time T_buf for the synchronous message.

Figure 16:
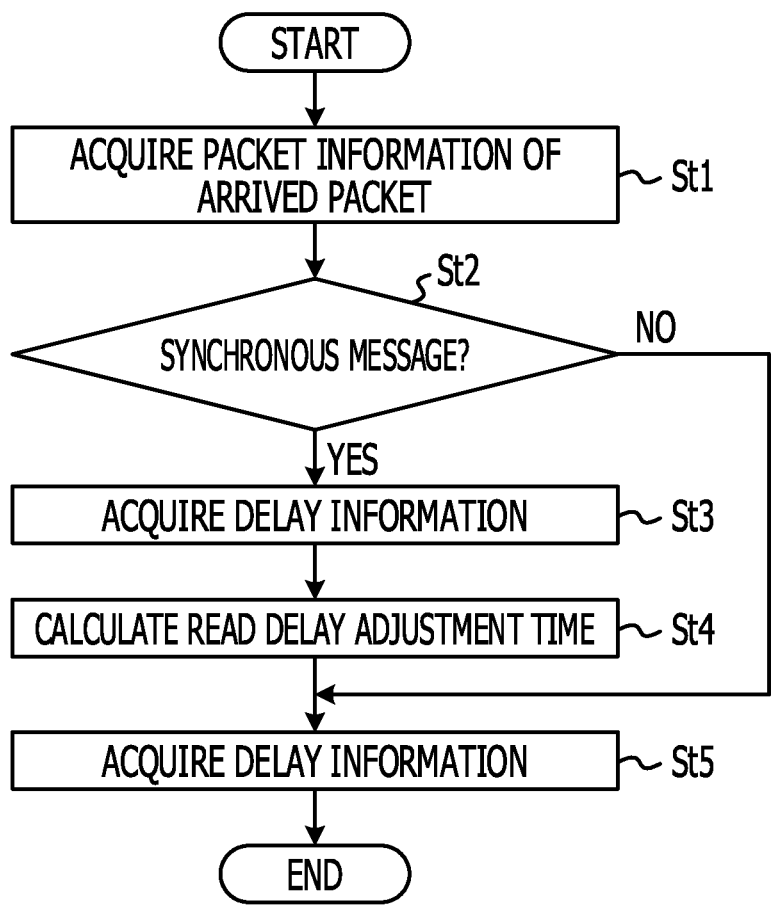
FIG. 16 is a flow chart illustrating an operation of a timing control unit.

FIG. 16 is a flow chart illustrating the operation of the timing control unit 45. The timing control unit 45 acquires the packet information of a packet arrived from the distribution unit 40 (step St1). Subsequently, the timing control unit 45 determines whether or not the packet is a synchronous message based on the type information included in the packet information (step St2).

When the packet is not a synchronous message (No in step St2), the timing control unit 45 determines a timing for reading the packet (such as a user packet) based on the packet length, the arrival timing, and the arrival order included in the packet information (step St5).

On the other hand, when the packet is a synchronous message (Yes in step St2), the timing control unit 45 acquires delay information from the delay information extraction unit 41 (step St3). Next, the timing control unit 45 calculates a read delay adjustment time T_adj for adjusting a relay delay time T_delay (see FIG. 5) to a fixed value, based on the read delay time T_buf indicated by the delay information (step St4).

Next, the timing control unit 45 determines a timing for reading the synchronous message based on the calculated read delay adjustment time T_adj (step St5). More specifically, the timing control unit 45 delays the timing for reading the synchronous message by the read delay adjustment time T_adj. In this manner, the operation of the timing control unit 45 is performed.

In this manner, the timing control unit 45 delays the synchronous message according to the read delay adjustment time T_adj which is calculated based on the read delay time T_buf which occurs in the buffer 20. Therefore, the effect of a variation in the read delay time T_buf on PDV is reduced. It is to be noted that the technology disclosed in Japanese Laid-Open Patent Publication No. 2008-22131 does not consider a variation in the read delay time T_buf for a buffer, and thus the variation may not be reduced.

Figure 17:
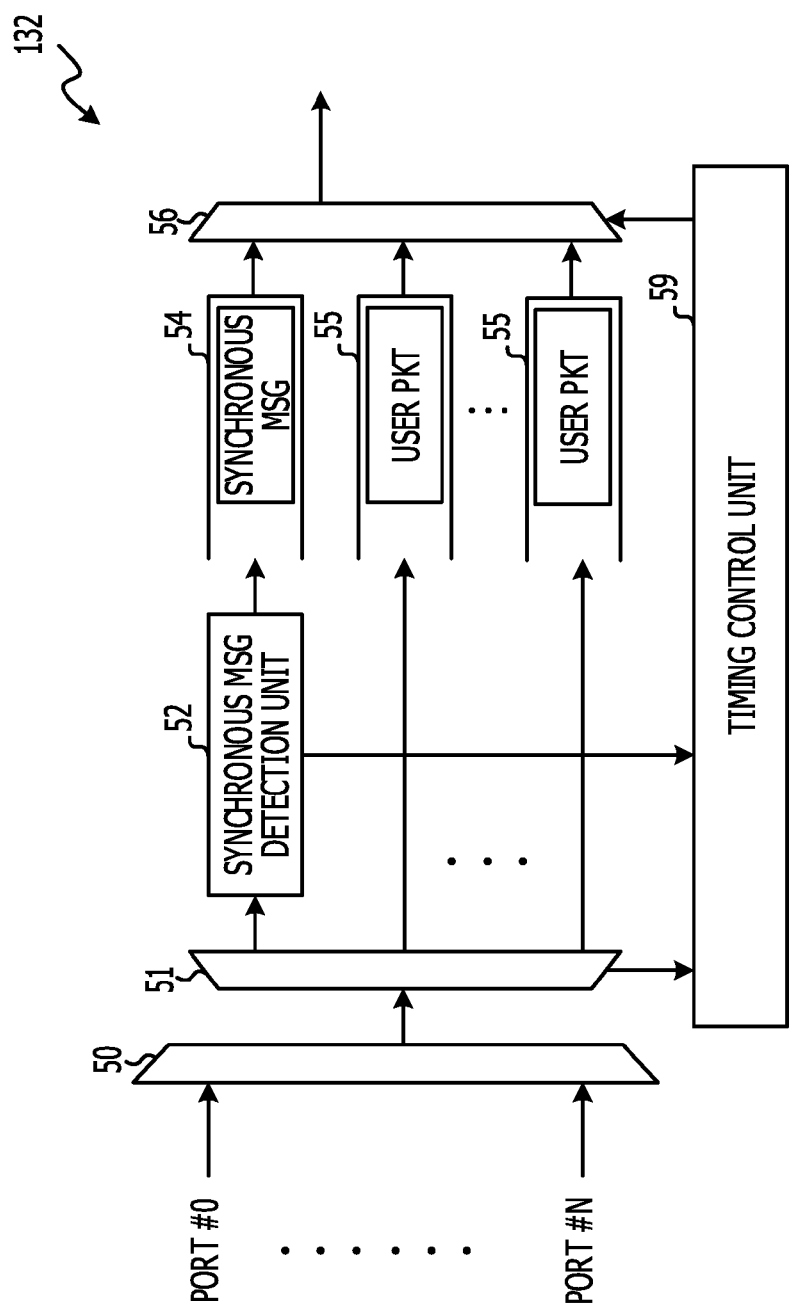
FIG. 17 is a configuration diagram illustrating the functional configuration of an output processing unit in the first embodiment.

FIG. 17 is a configuration diagram illustrating the functional configuration of the output processing unit 132 in the first embodiment. The output processing unit 132 has a MUX unit 50, a distribution unit 51, a synchronous message detection unit 52, a priority queue 54 for priority packets, a plurality of non-priority queues 55, a read processing unit 56, and a timing control unit 59.

The MUX unit 50 outputs packets to the distribution unit 51 successively after the packets are inputted via the switch unit 11. The distribution unit 51 determines the priority of a packet which is inputted from the MUX unit 50, outputs a priority packet to the priority queue 54, and outputs a non-priority packet to one of the non-priority queues 55. The distribution unit 51 outputs packet information to the timing control unit 59 each time a packet arrives, the packet information including the packet length, the arrival timing, and the arrival order.

The priority queue 54 and the non-priority queue 55 store priority packets and non-priority packets, respectively. That is, the priority queue 54 and the non-priority queue 55 store priority packets and non-priority packets separately. The priority queue 54 and the non-priority queue 55 each include a storage unit such as a memory.

The priority packet is a packet that is preferentially transmitted over a non-priority packet, and the priority packet includes the above-mentioned synchronous message. The priority packet may include a packet other than a synchronous message. On the other hand, the non-priority packet is a packet that is transmitted and received between the above-described RNC 92 and the BTSs 94, and the non-priority packet includes a user packet.

The distribution unit 51 may determine the priority of a packet, for example by referring to the "Type" information (see FIG. 11) in the MAC header. When a virtual local area network (VLAN) tag is assigned to a frame, a priority may be determined based on the priority information in the VLAN tag.

The synchronous message detection unit 52 is provided between the priority queue 54 and the distribution unit 51 to detect a synchronous message from the priority packet which is inputted to the priority queue 54, and outputs a notification of detection to the timing control unit 59. The read processing unit 56 selects one of the priority queue 54 and the non-priority queues 55, and reads a packet from the selected queue. The read packet is outputted to an external device via one of the ports #0 to #N.

The timing control unit 59 informs the read processing unit 56 of selected one of the priority queue 54 and the non-priority queues 55 to be read for a packet and a timing for reading the packet from the selected queue. The timing control unit 59 determines a timing for reading the synchronous message according to the conflict delay time T_cmp for the synchronous message.

Figure 18:
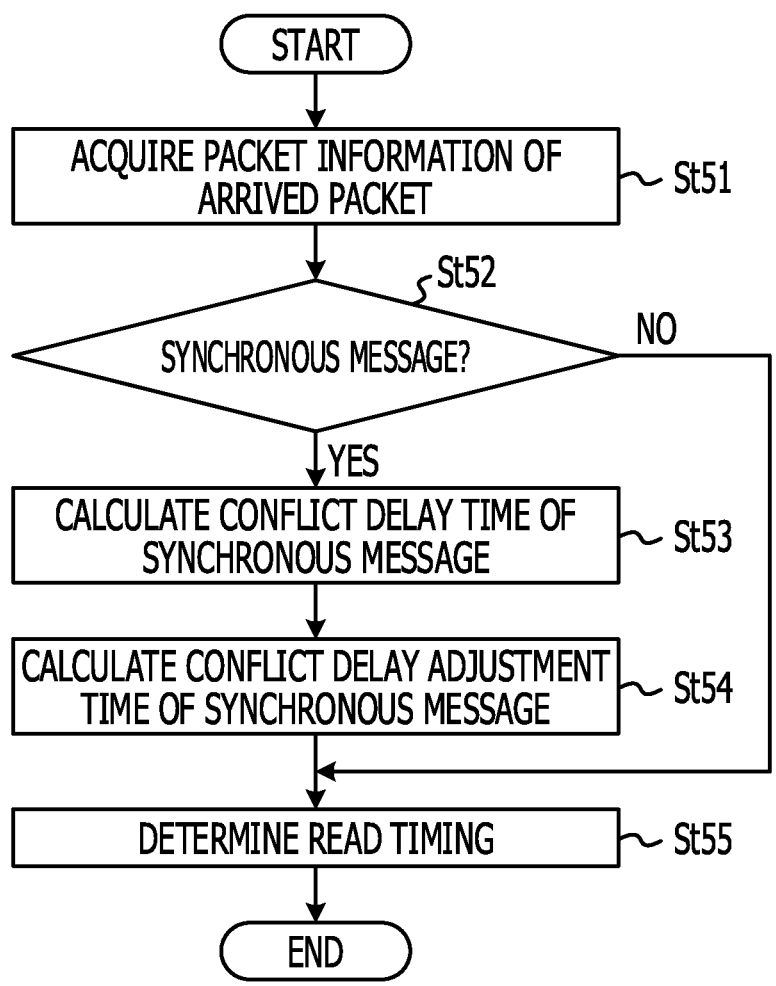
FIG. 18 is a flow chart illustrating an operation of the timing control unit.

FIG. 18 is a flow chart illustrating the operation of the timing control unit 59. The timing control unit 59 acquires the packet information of a packet arrived from the distribution unit 51 (step St51). Next, the timing control unit 59 determines the presence of a notification of detection from the synchronous message detection unit 52 (step St52).

When a notification of detection of a synchronous message is not present (No in step St52), the timing control unit 59 determines a timing for reading a packet (such as a user packet) based on the packet length, the arrival timing, and the arrival order included in the packet information (step St55).

On the other hand, when a notification of detection of a synchronous message is present (Yes in step St52), the timing control unit 59 calculates a conflict delay time T_cmp for the synchronous message (step St53). The conflict delay time T_cmp is calculated based on the amount of data which is not read for a non-priority packet (user packet) which is being read by the read processing unit 56, for example, when a synchronous message is inputted to the priority queue 54.

Next, the timing control unit 59 calculates a conflict delay adjustment time T_qos for adjusting the relay delay time T_delay (see FIG. 5) to a fixed value, based on the calculated conflict delay time T_cmp (step St54).

Next, the timing control unit 59 determines a timing for reading the synchronous message based on the calculated conflict delay adjustment time T_qos (step St55). More specifically, the timing control unit 59 delays the timing for reading the synchronous message by the conflict delay adjustment time T_qos. In this manner, the operation of the timing control unit 59 is performed.

In this manner, the timing control unit 59 delays the synchronous message according to a conflict delay adjustment time T_qos while satisfying QoS in packet transmission processing, the conflict delay adjustment time T_qos being calculated based on the conflict delay time T_cmp which occurs in the priority queue 54 and the non-priority queues 55. Therefore, the effect of a variation in the conflict delay time T_cmp on PDV is reduced.

Figure 19:
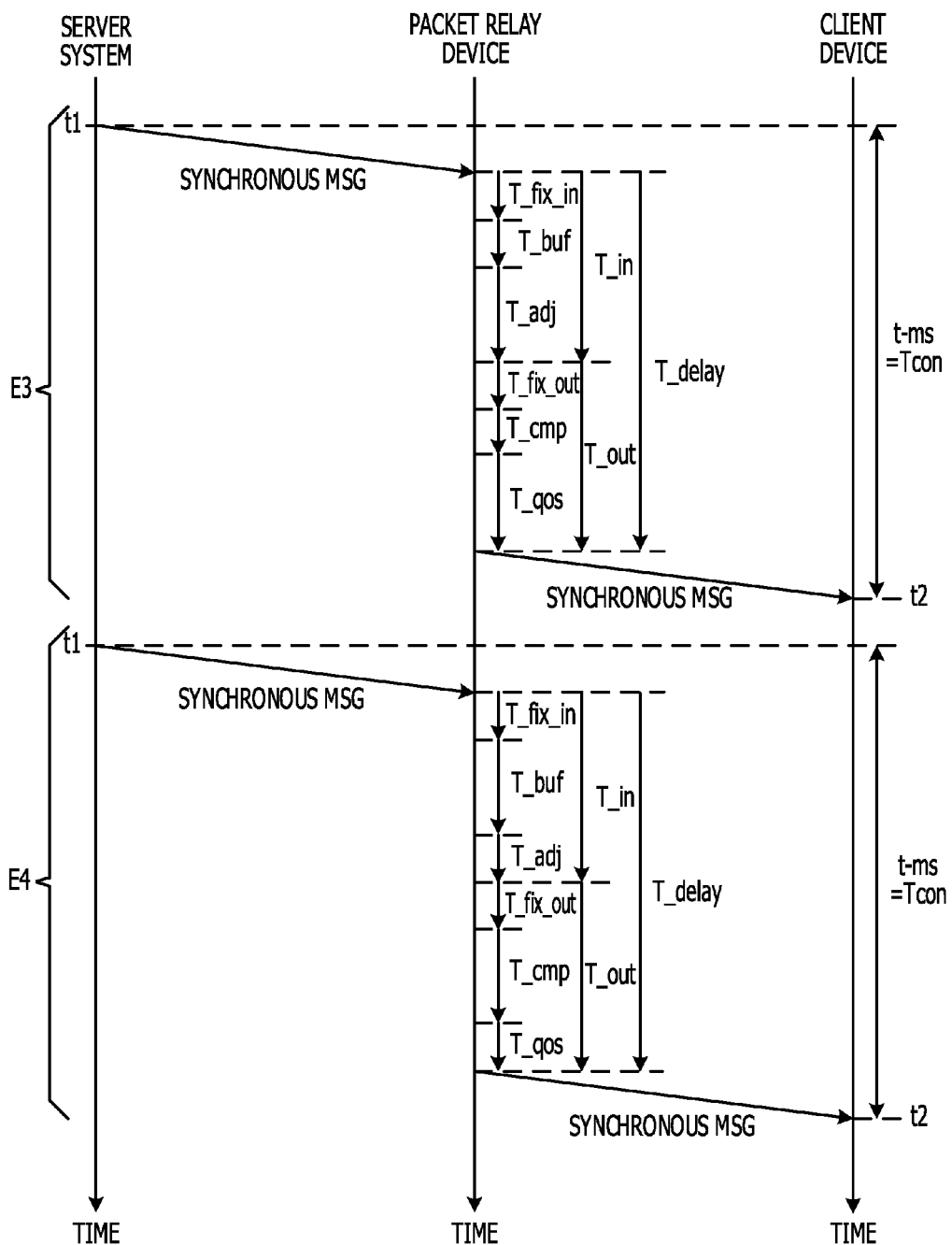
FIG. 19 is a ladder chart illustrating a delay time which occurs in a packet relay device according to the first embodiment.

FIG. 19 is a ladder chart illustrating a delay time which occurs in the packet relay device 1 according to the first embodiment. In FIG. 19, input delay time T_in indicates a delay time which occurs in the input processing unit 131, and output delay time T_out indicates a delay time which occurs in the output processing unit 132. Therefore, the relay delay time T_delay is the sum of the input delay time T_in and the output delay time T_out.

The input delay time T_in includes an input side fixed delay time T_fix_in, the read delay time T_buf, and the read delay adjustment time T_adj. Therefore, when the input delay time T_in is a predetermined value, the timing control unit 45 of the input processing unit 131 calculates the read delay adjustment time T_adj by the following Expression (6).

$$T\_adj = T\_in - T\_fix\_in - T\_buf \quad (6)$$

On the other hand, the output delay time T_out includes an output side fixed delay time T_fix_out, the conflict delay time T_cmp, and the conflict delay adjustment time T_qos. Therefore, when the output delay time T_out is a predetermined value, the timing control unit 59 of the output processing unit 132 calculates the conflict delay adjustment time T_qos by the following Expression (7).

$$T\_qos = T\_out - T\_fix\_out - T\_cmp \quad (7)$$

In this manner, with appropriate read delay adjustment time T_adj and conflict delay adjustment time T_qos, the relay delay T_delay has a fixed value even when the read delay time T_buf and the conflict delay time T_cmp are small (see symbol E3) or large (see symbol E4). Consequently, the PDV is effectively reduced and the transmission delay time t–ms has a fixed value, Tcon (see FIG. 6).

(Second Embodiment)

In the first embodiment, delay information indicating the read delay adjustment time T_adj is assigned to a synchronous message by the assignment processing unit 31. However, without being limited to this, the delay information may be assigned to an internal header by the internal header generation unit 21.

Figure 20:
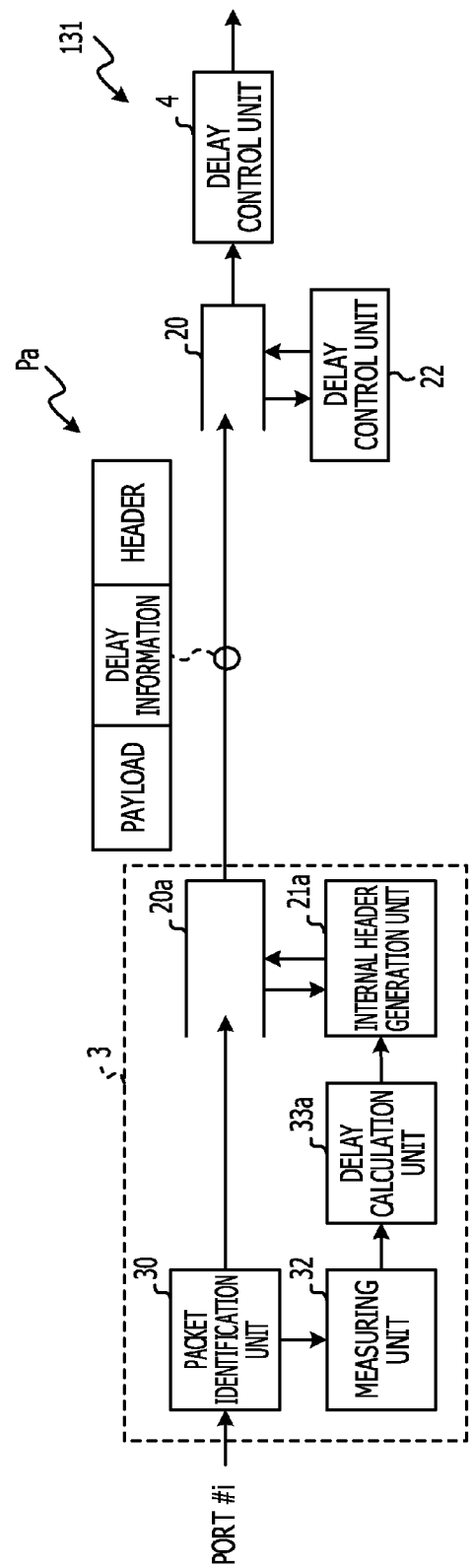
FIG. 20 is a configuration diagram illustrating the functional configuration of an input processing unit according to a second embodiment.

FIG. 20 is a configuration diagram illustrating the functional configuration of an input processing unit 131 according to a second embodiment. In FIG. 20, the components in common with those in FIG. 10 are labeled with the same symbols, and a description thereof is omitted.

The input processing unit 131 has the delay information generation unit 3, the buffer 20, the output port determination unit 22, and the delay control unit 4. The delay information generation unit 3 has the packet identification unit 30, the measuring unit 32, a delay calculation unit 33a, an internal header generation unit (assignment processing unit) 21a, and a buffer 20a. The configuration of the delay control unit 4 is as described with reference to FIG. 10, and the configuration of the output processing unit 132 is as described with reference to FIG. 17.

The delay calculation unit 33a calculates a read delay time T_buf for the buffer 20 for synchronous messages based on the packet lengths and the packet interval which are measured by the measuring unit 32, and outputs the read delay time T_buf to the internal header generation unit 21a. The technique for calculating the read delay time T_buf is as described above.

The internal header generation unit 21a generates delay information which indicates the read delay time T_buf that is inputted from the delay calculation unit 33a, and generates an internal header including the delay information. The internal header generation unit 21a assigns the generated internal header to a synchronous message stored in the buffer 20a (see symbol Pa). Thus, the delay information is assigned to part of the area of the internal header, and so the internal header is effectively used.

In this manner, the internal header generation unit 21a reads a synchronous message from the buffer 20a and assigns the delay information to the read synchronous message. Consequently, processing (processing of assigning an internal header in this example) of the synchronous message stored in the buffer 20a and processing of assigning the delay information may be performed at the same time, and thus the device configuration is simplified. According to the present embodiment, PDV is reduced similarly to the first embodiment.

(Third Embodiment)

In the above-described embodiment, the delay control unit 4 is provided in the input processing unit 131. However, without being limited to this, instead of the delay control unit 4, a delay control unit may be provided in the output processing unit 132. In this case, the delay control unit includes the configuration illustrated in FIG. 17.

Figure 21:
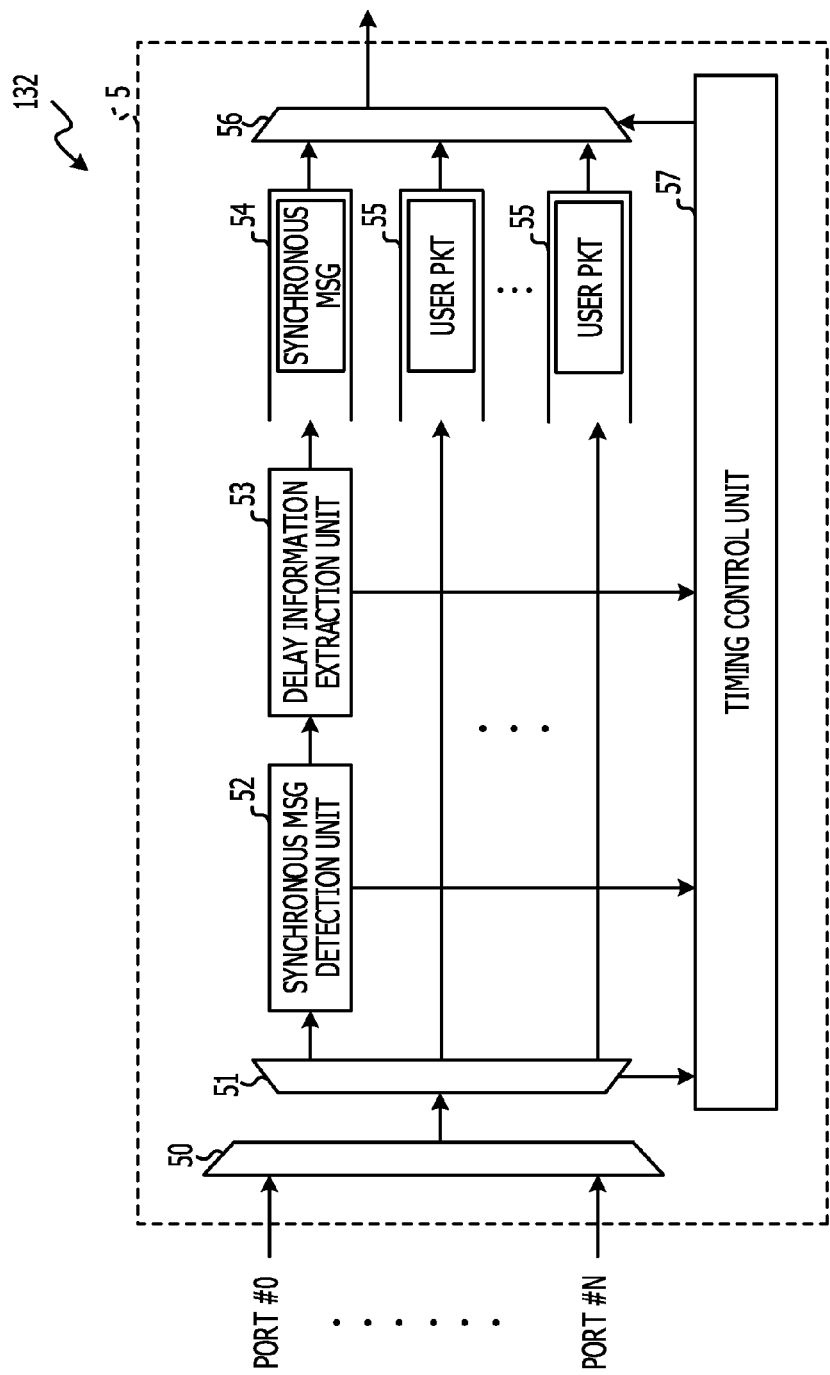
FIG. 21 is a configuration diagram illustrating the functional configuration of an output processing unit according to a third embodiment.

FIG. 21 is a configuration diagram illustrating the functional configuration of an output processing unit 132 according to a third embodiment. In FIG. 21, the components in common with those in FIG. 17 are labeled with the same symbols, and a description thereof is omitted.

The output processing unit 132 performs transmission processing so as to satisfy QoS and has a delay control unit 5 to control delay of a synchronous message. The delay control unit 5 has the MUX unit 50, the distribution unit 51, the synchronous message detection unit 52, a delay information extraction unit 53, the priority queue 54, the plurality of non-priority queues 55, the read processing unit 56, and a timing control unit 57.

The delay information extraction unit 53 is provided between the synchronous message detection unit 52 and the priority queue 54 so as to extract delay information from a synchronous message and to output the delay information to the timing control unit 57. The delay information is generated in the input processing unit 131 by the delay information generation unit 3 illustrated in FIG. 10 or FIG. 20, and is assigned to the synchronous message. The delay information extraction unit 53 may delete the delay information from the synchronous message after the delay information is extracted.

The timing control unit 57 informs the read processing unit 56 of selected one of the priority queue 54 and the non-priority queues 55 to be read for a packet and a timing for reading the packet from the selected queue. The timing control unit 57 determines a timing for reading the synchronous message according to the read delay time T_buf and the conflict delay time T_cmp for the synchronous message.

Figure 22:
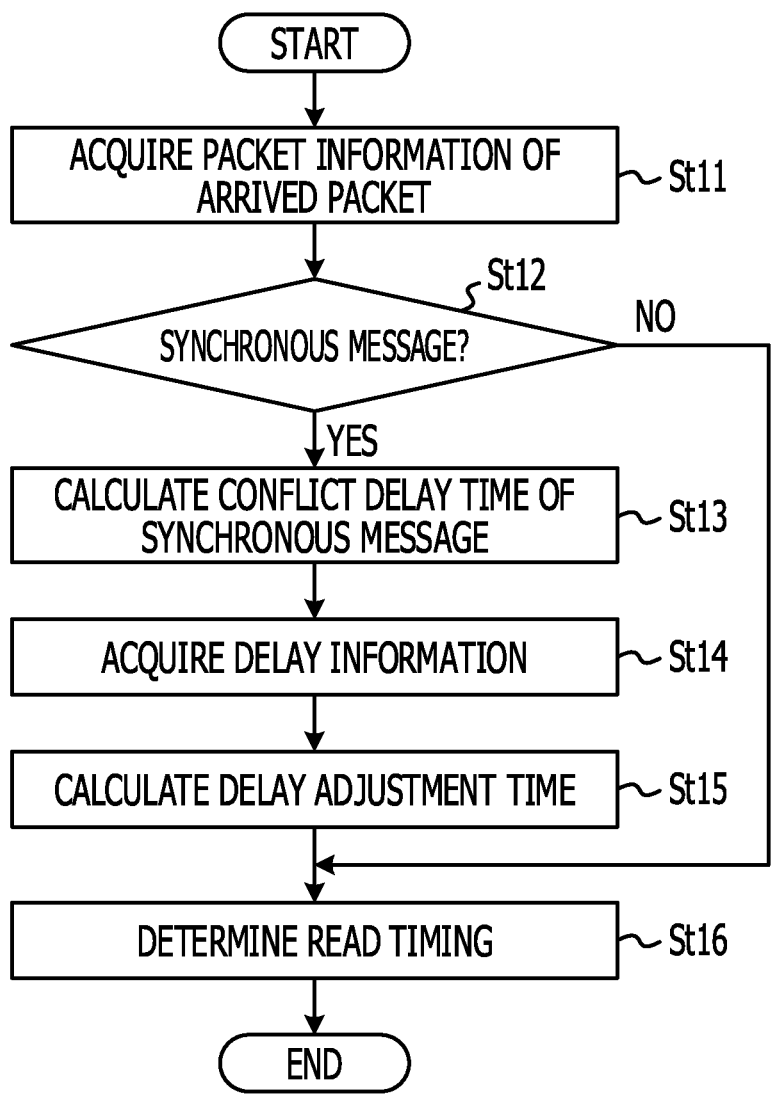
FIG. 22 is a flow chart illustrating an operation of the timing control unit.

FIG. 22 is a flow chart illustrating the operation of the timing control unit 57. The timing control unit 57 acquires the packet information of a packet arrived from the distribution unit 51 (step St11). Next, the timing control unit 57 determines the presence of a notification of detection from the synchronous message detection unit 52 (step St12).

When a notification of detection of a synchronous message is not present (No in step St12), the timing control unit 57 determines a timing for reading a packet (such as a user packet) based on the packet length, the arrival timing, and the arrival order included in the packet information (step St16).

On the other hand, when a notification of detection of a synchronous message is present (Yes in step St12), the timing control unit 57 calculates a conflict delay time T_cmp for the synchronous message (step St13). The conflict delay time T_cmp is calculated based on the amount of data which is not read for a non-priority packet (user packet) which is being read by the read processing unit 56, for example, when a synchronous message is inputted to the priority queue 54.

Next, the timing control unit 57 acquires delay information from the delay information extraction unit 53 (step St14). The timing control unit 57 obtains a read delay time T_buf from the delay information.

Next, the timing control unit 57 calculates a delay adjustment time Ta_adj for adjusting a relay delay time T_delay (see FIG. 5) to a fixed value, based on the calculated conflict delay time T_cmp and the read delay time T_buf (step St15).

Next, the timing control unit 57 determines a timing for reading the synchronous message based on the calculated delay adjustment time Ta_adj (step St16). More specifically, the timing control unit 57 delays the timing for reading the synchronous message by the delay adjustment time Ta_adj. In this manner, the operation of the timing control unit 57 is performed.

In this manner, the timing control unit 57 determines a timing for reading the synchronous message, according to the conflict delay time T_cmp and the read delay time T_buf for the synchronous message. Therefore, the effect of a variation in the read delay time T_buf and the conflict delay time T_cmp on PDV is reduced.

Figure 23:
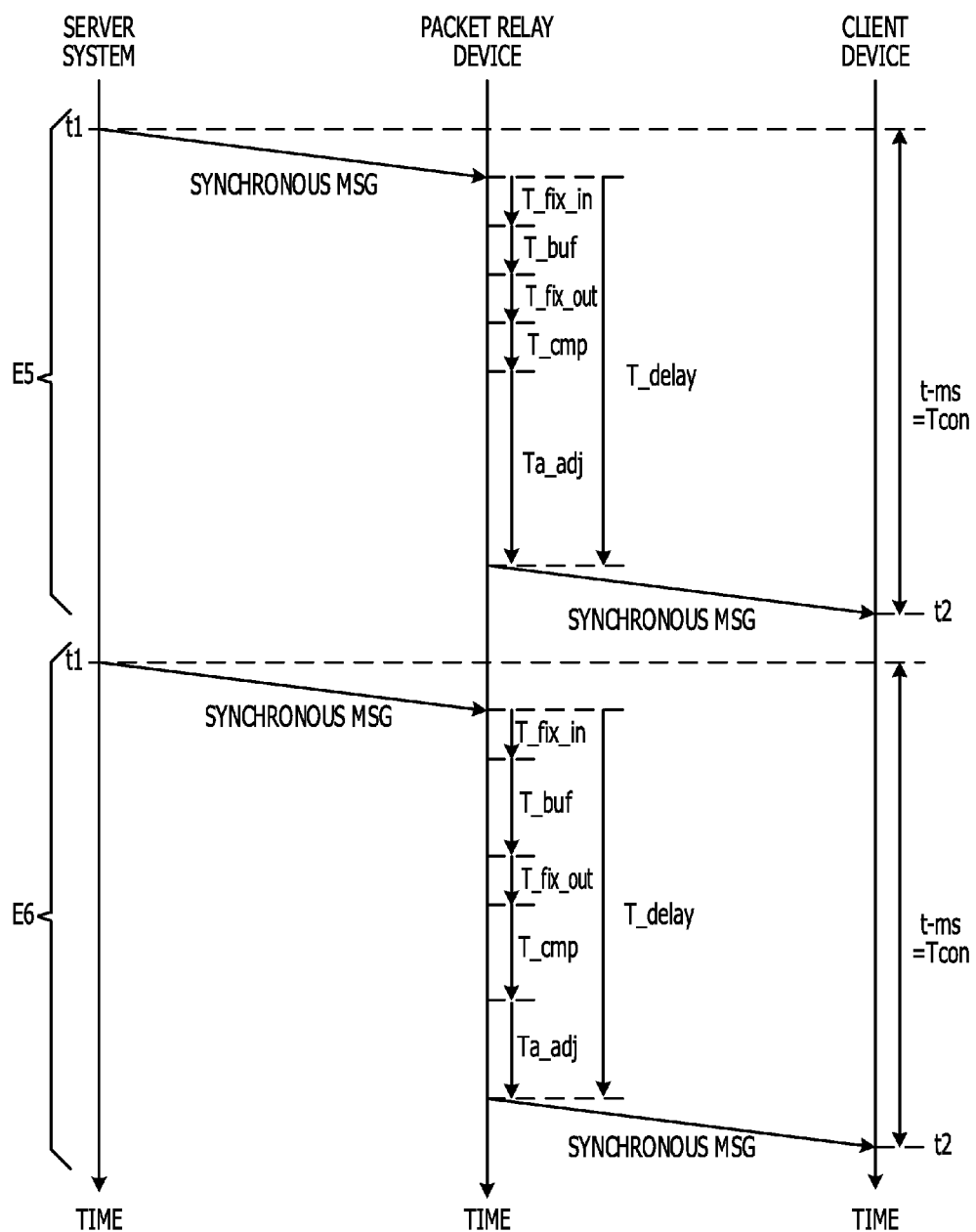
FIG. 23 is a ladder chart illustrating a delay time which occurs in a packet relay device according to the third embodiment.

FIG. 23 is a ladder chart illustrating a delay time which occurs in the packet relay device 1 according to the present embodiment. The relay delay time T_delay includes the input side fixed delay time T_fix_in, the read delay time T_buf, the output side fixed delay time T_fix_out, the conflict delay time T_cmp, and the delay adjustment time Ta_adj. Therefore, when the relay delay time T_delay is a predetermined value, the timing control unit 57 calculates the read delay adjustment time Ta_adj by the following Expression (8).

$$Ta\_adj = T\_delay - T\_fix\_in - T\_buf - T\_fix\_out - T\_cmp \quad (8)$$

In this manner, with appropriate delay adjustment time Ta_adj, the relay delay T_delay has a fixed value even when the read delay time T_buf and the conflict delay time T_cmp are small (see symbol E5) or large (see symbol E6). Consequently, the PDV is effectively reduced and the transmission delay time t–ms has a fixed value, Tcon (see FIG. 6).

(Fourth Embodiment)

In the embodiments described so far, the delay control units 4, 5 control delay of a synchronous message according to a read delay time T_buf which occurs in the buffers 20, 20a of the input processing unit 131. However, the embodiments are not limited to this. The delay control units 4, 5 may further control delay according to a read delay time which occurs in the buffer of the output processing unit 132.

Figure 24:
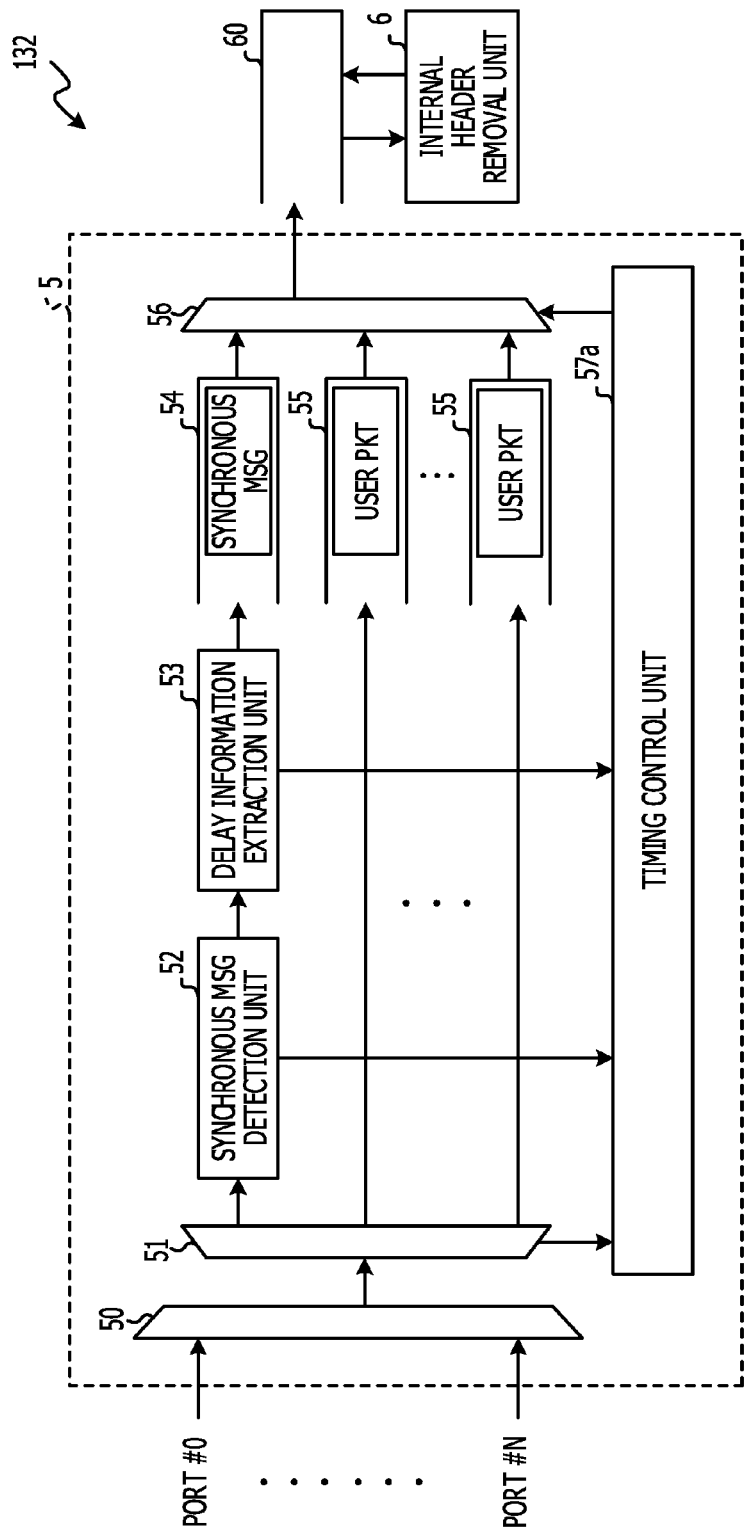
FIG. 24 is a configuration diagram illustrating the functional configuration of an output processing unit according to a fourth embodiment.

FIG. 24 is a configuration diagram illustrating the functional configuration of an output processing unit according to a fourth embodiment. In FIG. 24, the components in common with those in FIG. 21 are labeled with the same symbols, and a description thereof is omitted.

The output processing unit 132 has the delay control unit 5, an internal header removal unit 6, and an output side buffer 60. The output side buffer 60 stores a packet which is read from the queue 54, 55 of the delay control unit 5. The internal header removal unit 6 removes the internal header from a packet which is stored in the output side buffer 60. The packet with the internal header removed is transmitted from the buffer 60 to an external device via one of the ports #0 to #N.

The delay control unit 5 controls delay based on not only the read delay T_buf in the buffers 20, 20a provided in the input processing unit 131 but also the read delay Ta_buf in the output side buffer 60. The delay control unit 5 has the MUX unit 50, the distribution unit 51, the synchronous message detection unit 52, the delay information extraction unit 53, the priority queue 54, the plurality of non-priority queues 55, the read processing unit 56, and a timing control unit 57a.

The timing control unit 57a informs the read processing unit 56 of selected one of the priority queue 54 and the non-priority queues 55 to be read for a packet and a timing for reading the packet from the selected queue. The timing control unit 57a determines a timing for reading the synchronous message according to the read delay time T_buf and the conflict delay time T_cmp for the synchronous message. This operation is as described with reference to FIG. 22.

The timing control unit 57a calculates the read delay time Ta_buf of the synchronous message in the output side buffer 60 based on the read timing which is determined by the processing illustrated in FIG. 22. The packet interval between the packets inputted to the output side buffer 60 is estimated, for example, from the determined read timing, then the read delay time Ta_buf is calculated by the above-described calculation technique using the packet lengths and the packet interval. The timing control unit 57a corrects the determined read timing based on the calculated read delay time Ta_buf.

Figure 25:
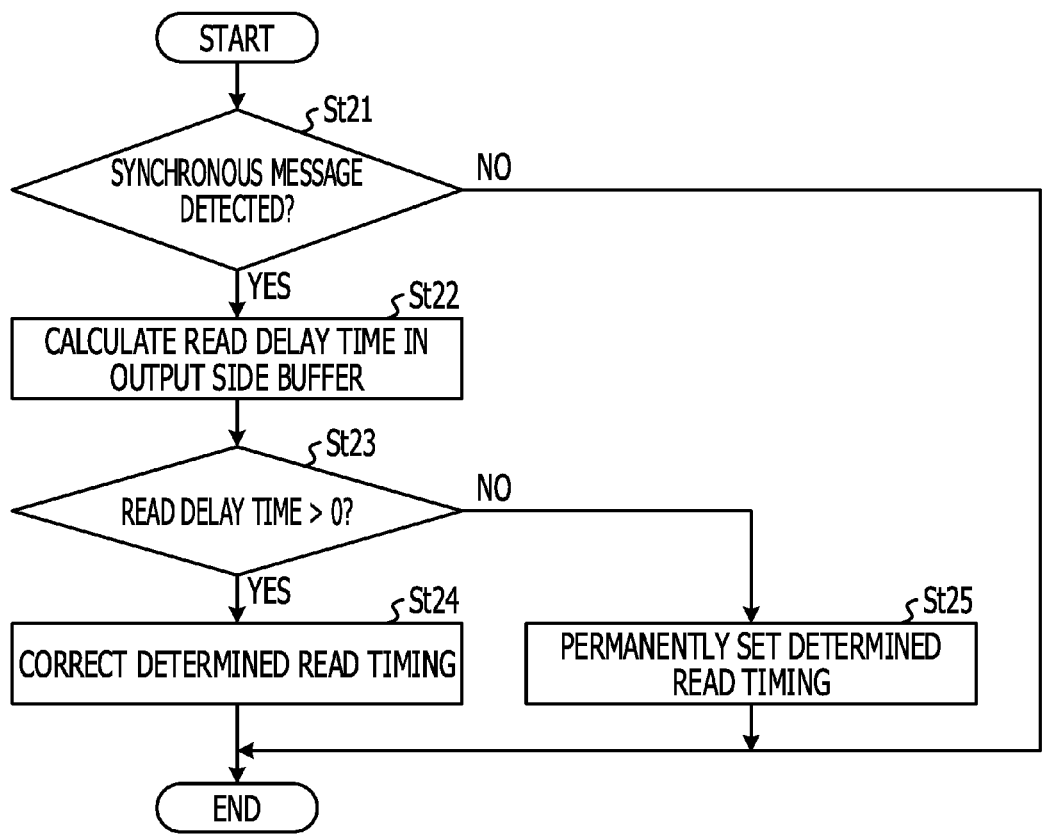
FIG. 25 is a flow chart illustrating an operation of correction processing of read timing.

FIG. 25 is a flow chart illustrating the operation of correction processing of the read timing. The timing control unit 57a determines the presence of a notification of detection from the synchronous message detection unit 52 (step St21). When a notification of detection of a synchronous message is not present (No in step St21), the timing control unit 57a terminates its processing. On the other hand, when a notification of detection of a synchronous message is present (Yes in step St21), the timing control unit 57a calculates the read delay time Ta_buf of the synchronous message in the output side buffer 60 (step St22).

Next, the timing control unit 57a determines whether or not the calculated read delay time Ta_buf is longer than 0 (step St23). When the read delay time Ta_buf is shorter than or equal to 0 (No in step St23), the timing control unit 57a determines that no delay occurs in the output side buffer 60, and decides the read timing which is determined by the operation illustrated in FIG. 22 (step St25) and terminates its processing.

On the other hand, when the read delay time Ta_buf is longer than 0 (Yes in step St23), the timing control unit 57a corrects a read timing based on the read delay time Ta_buf, the read timing being determined by the processing illustrated in FIG. 22 (step St24).

Figure 26:
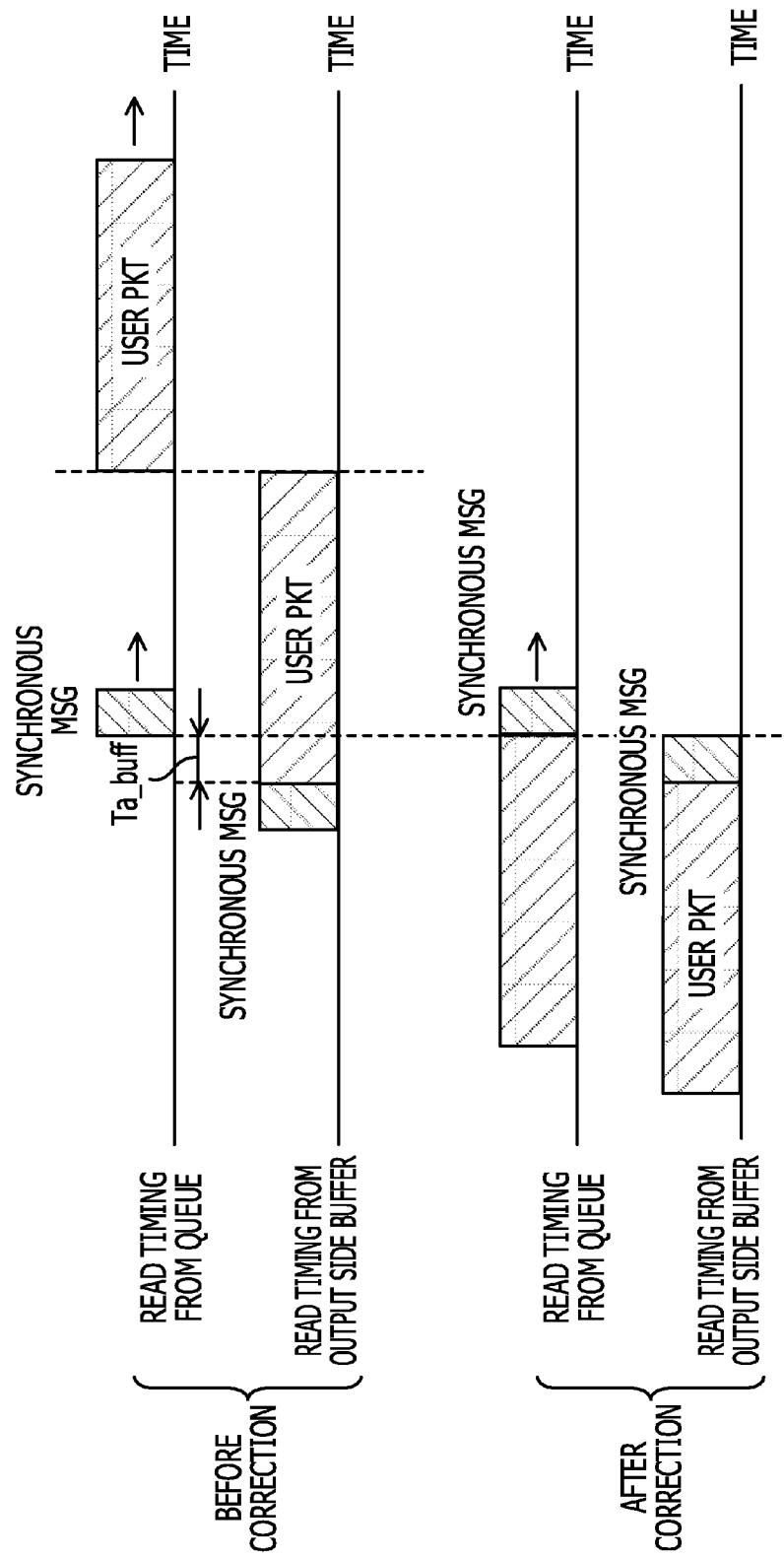
FIG. 26 is a time chart illustrating an example of correction processing of read timing.

FIG. 26 is a time chart illustrating an example of correction processing of the read timing. The upper part of FIG. 26 illustrates a timing for reading a synchronous message and a user packet from the queues 54, 55, and a timing for reading a synchronous message and a user packet from the output side buffer 60 before correction. The lower part of FIG. 26 illustrates a timing for reading a synchronous message and a user packet from the queues 54, 55, and a timing for reading a synchronous message and a user packet from the output side buffer 60 after correction.

In the example of FIG. 26, with the read timing before correction, a read delay time Ta_buf occurs in the output side buffer 60 because the user packet precedes the synchronous message. Thus, the timing control unit 57a corrects the read timing so that the synchronous message is read before the user packet. Thereby, the read delay time Ta_buf becomes 0. The correction processing of read timing is not limited to this example, and the packet interval between the user packet and the synchronous message may be increased so that the read delay time Ta_buf becomes 0, for example.

The read delay time Ta_buf terminates its processing after the read timing is corrected. In this manner, the correction processing of read timing is performed.

In this way, the timing control unit 57a calculates the read delay time Ta_buff of the synchronous message in the output side buffer 60 based on the determined read timing, and corrects the determined read timing according to the calculated read delay time.

Therefore, according to the present embodiment, the effect of a variation in the read delay time T_buf and the conflict delay time T_cmp on PDV is reduced, and the read delay time Ta_buff in the output side buffer 60 is reduced.

(Fifth Embodiment)

In the embodiments described so far, the input processing unit 131 has the buffers 20, 20a. However, without being limited to this, the input processing unit 131 may not have the buffers 20, 20a and only the output processing unit 132 may have the buffer 60. In this case, the delay control unit 5 controls delay of a synchronous message based on the read delay time Ta_buff and the conflict delay time T_cmp in the output side buffer 60.

Figure 27:
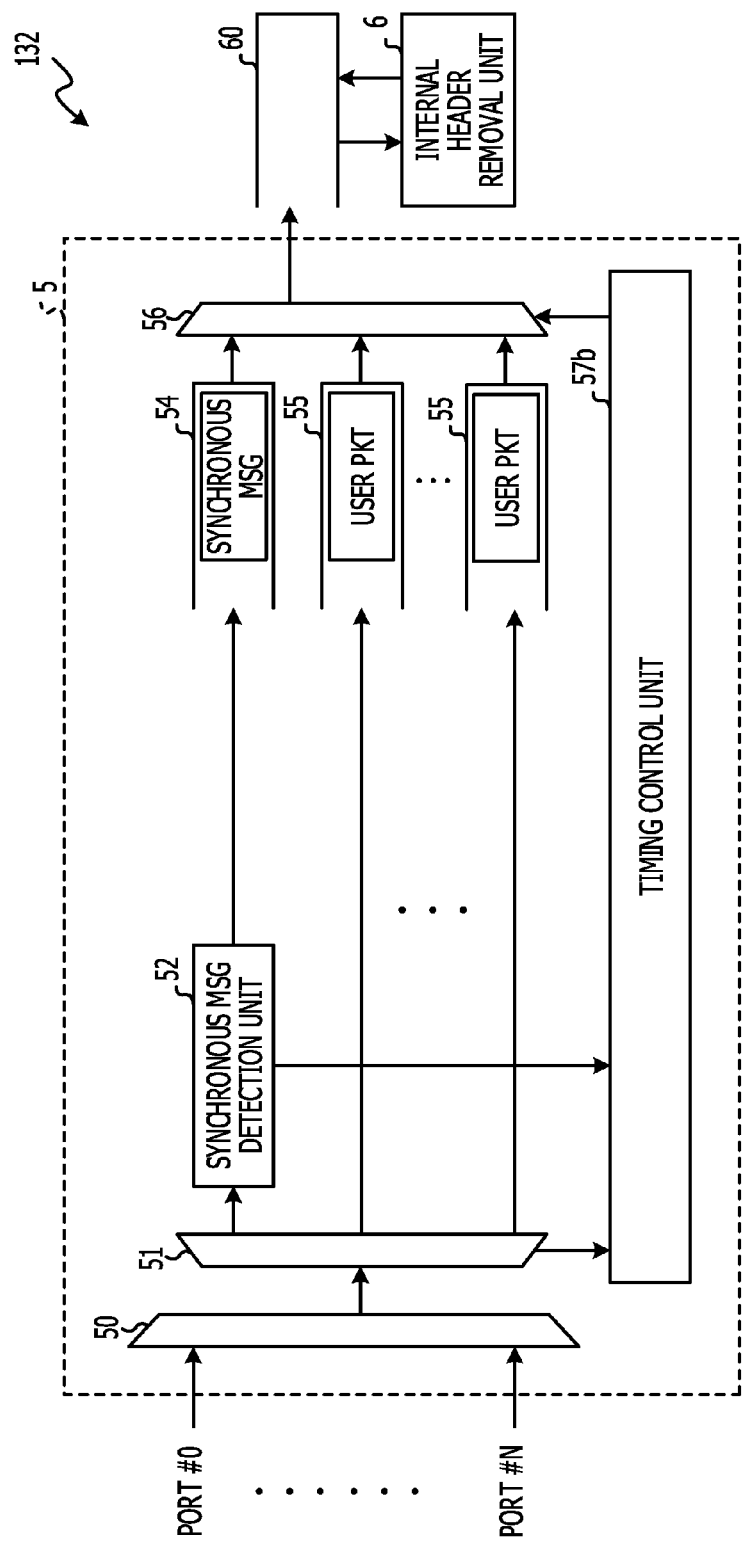
FIG. 27 is a configuration diagram illustrating the functional configuration of an output processing unit according to a fifth embodiment.

FIG. 27 is a configuration diagram illustrating the functional configuration of an output processing unit 132 according to a fifth embodiment. In FIG. 27, the components in common with those in FIG. 24 are labeled with the same symbols, and a description thereof is omitted.

The output processing unit 132 has the delay control unit 5, the internal header removal unit 6, and the output side buffer 60. The delay control unit 5 has the MUX unit 50, the distribution unit 51, the synchronous message detection unit 52, the priority queue 54, the plurality of non-priority queues 55, the read processing unit 56, and a timing control unit 57b.

The timing control unit 57b informs the read processing unit 56 of selected one of the priority queue 54 and the non-priority queues 55 to be read for a packet and a timing for reading the packet from the selected queue. The timing control unit 57b determines a timing for reading the synchronous message according to the conflict delay time T_cmp for the synchronous message. This operation is as described with reference to FIG. 18.

The timing control unit 57b calculates the read delay time Ta_buf of the synchronous message in the output side buffer 60 based on the read timing which is determined by the processing illustrated in FIG. 18. The packet interval between the packets inputted to the output side buffer 60 is estimated, for example, from the determined read timing, then the read delay time Ta_buf is calculated by the above-described calculation technique using the packet lengths and the packet interval. The timing control unit 57b corrects the determined read timing based on the calculated read delay time Ta_buf. The correction processing is as described with reference to FIGS. 25 and 26.

In this manner, the timing control unit 57b calculates the read delay time Ta_buff of the synchronous message in the output side buffer 60 based on the determined read timing, and corrects the determined read timing according to the calculated read delay time.

Therefore, according to the present embodiment, the effect of a variation in the conflict delay time T_cmp on PDV is reduced, and the read delay time Ta_buff in the output side buffer 60 is reduced.

(Sixth Embodiment)

In the embodiments described so far, it may be determined that delay adjustment is not possible for a synchronous message with the conflict delay time T_cmp and the read delay time T_buff exceeding a threshold value, and the synchronous message may be discarded. The client device 95 performs synchronous processing by preferentially using a synchronous message with small delay, and thus does not receive all synchronous messages in some cases. Therefore, the discard processing of a synchronous message has no effect on the synchronous processing in the client device 95.

Figure 28:
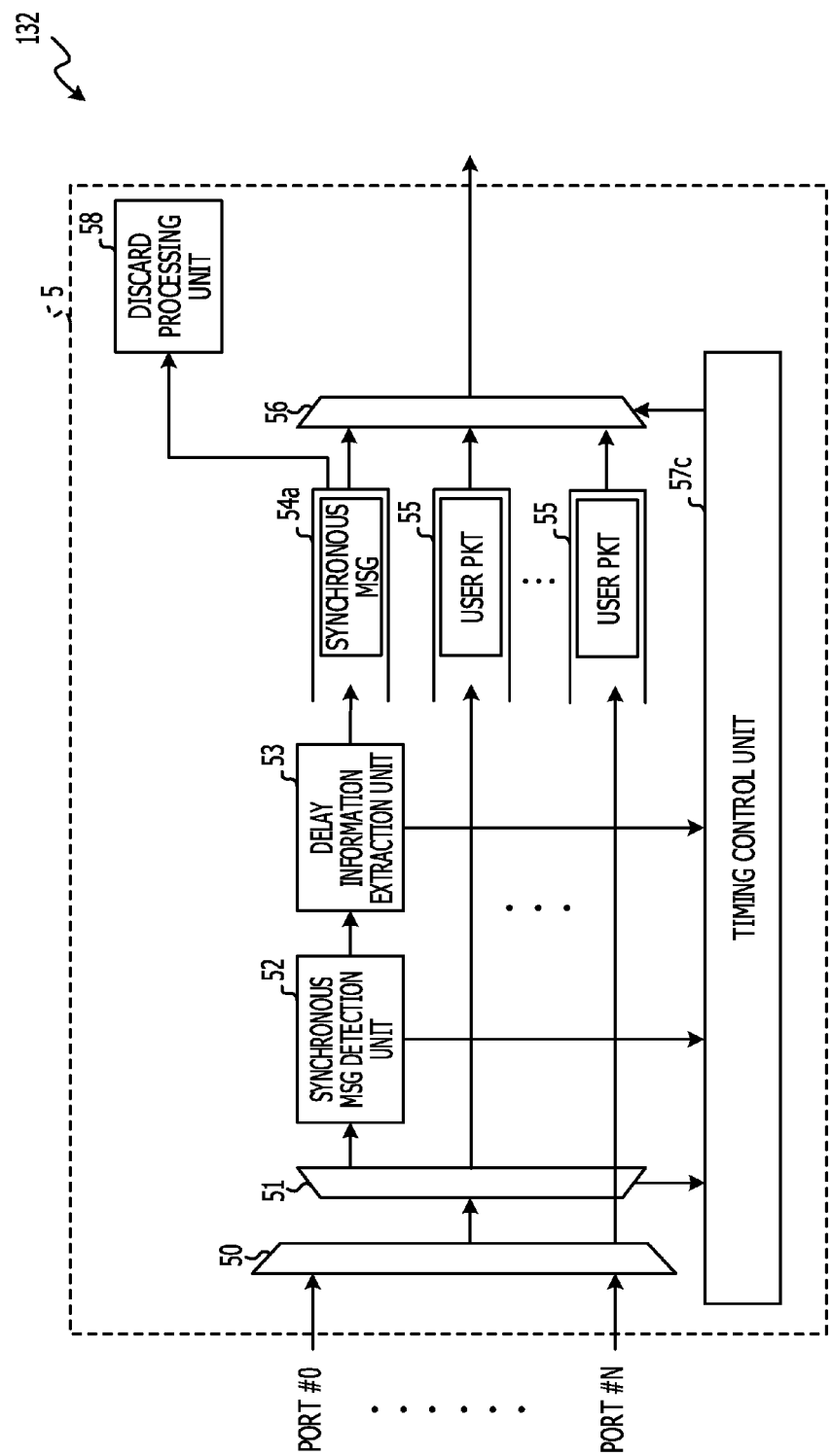
FIG. 28 is a configuration diagram illustrating the functional configuration of an output processing unit according to a sixth embodiment.

FIG. 28 is a configuration diagram illustrating the functional configuration of an output processing unit 132 according to a sixth embodiment. In FIG. 28, the components in common with those in FIG. 21 are labeled with the same symbols, and a description thereof is omitted.

The delay control unit 5 has the MUX unit 50, the distribution unit 51, the synchronous message detection unit 52, the delay information extraction unit 53, a priority queue 54a, the plurality of non-priority queues 55, the read processing unit 56, a timing control unit 57c, and a discard processing unit 58. Similarly to the above-described priority queue 54, the priority queue 54a stores a synchronous message and outputs the stored synchronous message to the discard processing unit 58 according to a discard command from the timing control unit 57c. The discard processing unit 58 discards the synchronous message which is inputted from the priority queue 54a.

The timing control unit 57c informs the read processing unit 56 of selected one of the priority queue 54a and the non-priority queues 55 to be read for a packet and a timing for reading the packet from the selected queue. The timing control unit 57c determines a timing for reading the synchronous message according to the read delay time T_buf and the conflict delay time T_cmp for the synchronous message.

Figure 29:
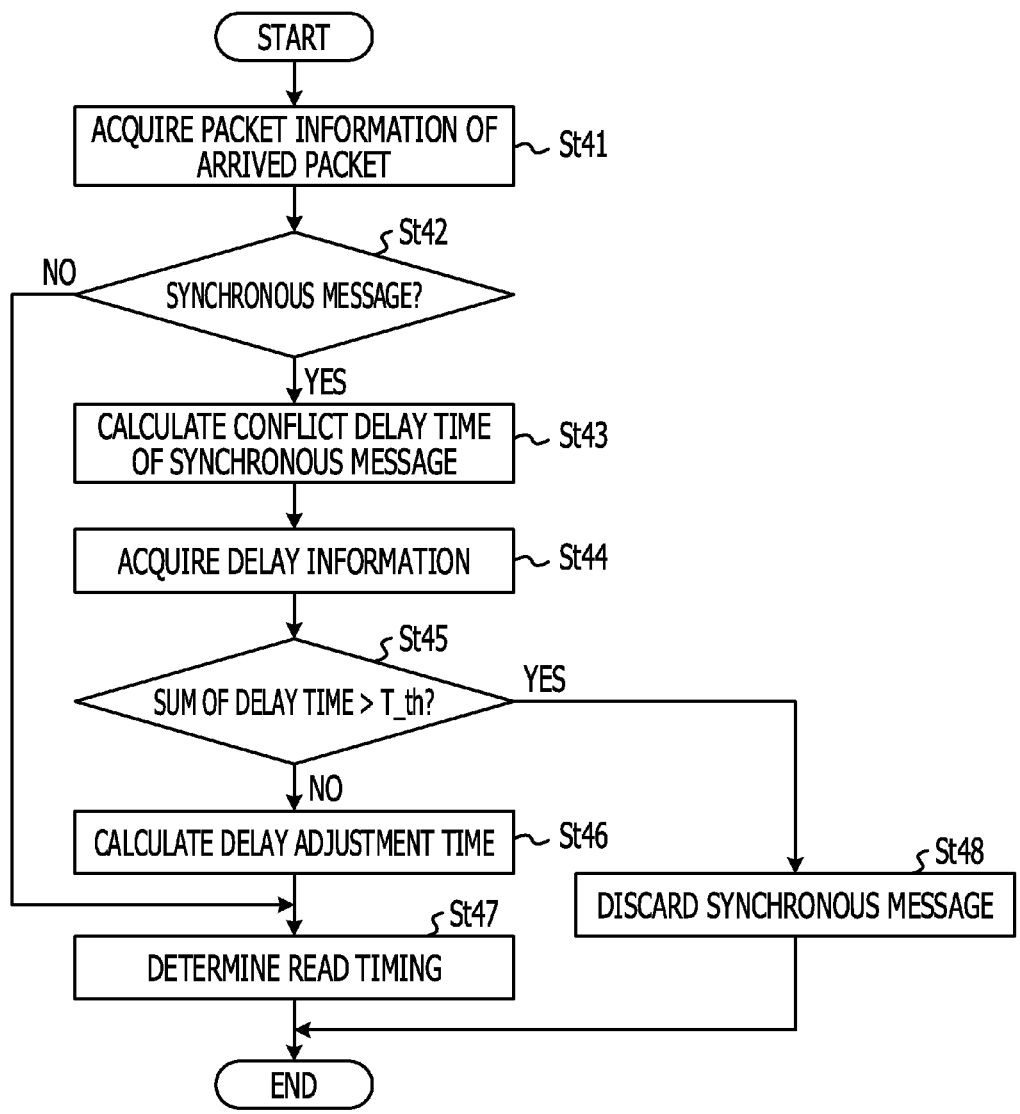
FIG. 29 is a flow chart illustrating an operation of the timing control unit.

FIG. 29 is a flow chart illustrating the operation of the timing control unit 57c. The timing control unit 57c acquires the packet information of a packet arrived from the distribution unit 51 (step St41). Next, the timing control unit 57c determines the presence of a notification of detection from the synchronous message detection unit 52 (step St42).

When a notification of detection of a synchronous message is not present (No in step St42), the timing control unit 57c determines a timing for reading a packet (such as a user packet) based on the packet length, the arrival timing, and the arrival order included in the packet information (step St47).

On the other hand, when a notification of detection of a synchronous message is present (Yes in step St42), the timing control unit 57c calculates the conflict delay time T_cmp of the synchronous message (step St43). The conflict delay time T_cmp is calculated based on the amount of data which is not read for a non-priority packet (user packet) which is being read by the read processing unit 56, for example, when a synchronous message is inputted to the priority queue 54.

Next, the timing control unit 57c acquires delay information from the delay information extraction unit 53 (step St44). The timing control unit 57c obtains a read delay time T_buf from the delay information.

Next, the timing control unit 57c determines whether or not the sum of the conflict delay time T_cmp and read delay time T_buf of the synchronous message is longer than a predetermined threshold value (step St45). When the sum of the conflict delay time T_cmp and read delay time T_buf of the synchronous message is longer than the predetermined threshold value (Yes in step St45), the timing control unit 57c outputs a discard command for the synchronous message to the priority queue 54a (step St48).

On the other hand, when the sum of the conflict delay time T_cmp and read delay time T_buf of the synchronous message is shorter than or equal to the predetermined threshold value (No in step St45), the timing control unit 57c calculates the above-described delay adjustment time Ta_adj (step St46). Next, the timing control unit 57c determines a timing for reading the synchronous message based on the calculated delay adjustment time Ta_adj (step St47). In this manner, the operation of the timing control unit 57c is performed.

FIG. 30 is a time chart illustrating an example of the operation of the delay control unit 5. FIG. 30 illustrates a timing for inputting a synchronous message to the packet relay device 1, a delay time, and a timing for reading from the queue 54a.

As illustrated by symbol E7, when the sum of the conflict delay time T_cmp and read delay time T_buf of the synchronous message is short (when T_buf+T_cmp<<T_th), the delay adjustment time Ta_adj is long. On the other hand, as illustrated by symbol E9, when the sum of the conflict delay time T_cmp and read delay time T_buf of the synchronous message is long (when T_buf+T_cmp≤T_th), the delay adjustment time Ta_adj is short.

As illustrated by symbol E8, when the sum of the conflict delay time T_cmp and read delay time T_buf of the synchronous message is longer than a threshold value T_th (when T_buf+T_cmp>T_th), the synchronous message is discarded.

In this manner, when the sum of the conflict delay time T_cmp and read delay time T_buf of the synchronous message is longer than the threshold value T_th, the timing control unit 57c causes the priority queue 54 which stores synchronous messages to discard the synchronous message. Thus, in the case where delay adjustment for a synchronous message is not possible, the effect of the synchronous message on the transmission delay time t−ms is avoided. The case where delay adjustment for a synchronous message is not possible indicates, for example, the case where the sum of the fixed delay time T_fix_in, T_fix_out, the conflict delay time T_cmp, and the read delay time T_buf exceeds a predetermined relay delay time T_delay in FIG. 19.

In the present embodiment, the timing control unit 57c compares the sum of the conflict delay time T_cmp and the read delay time T_buf with the threshold value T_th to determine whether or not a synchronous message is discarded, according to a result of the comparison. However, the present embodiment is not limited to this. The timing control unit 57c may compare one of the conflict delay time T_cmp and the read delay time T_buf with the threshold value T_th to determine whether or not a synchronous message is discarded, according to a result of the comparison.

As described so far, the packet relay device 1 according to the embodiment has the buffers 20, 20a for storing packets, the delay calculation unit 33, and the delay control units 4, 5. The delay calculation unit 33 calculates the read delay time T_buf of a synchronous message from the buffers 20, 20a based on the packet lengths and the packet interval of the packets inputted to the buffers 20, 20a. The delay control units 4, 5 delay a synchronous message which is read from the buffers 20, 20a, according to the read delay time T_buf which is calculated by the delay calculation unit 33.

The packet relay device 1 according to the embodiment calculates the read delay time T_buf of a synchronous message based on the packet lengths and the packet interval of the packets inputted to the buffers 20, 20a, and thus the delay time T_buf may be calculated using a simple configuration. The delay control units 4, 5 delay a synchronous message read from the buffers 20, 20a according to the read delay time T_buf, and thus PDV due to the read delay time T_buf is reduced.

The packet transmission device (output processing unit 132) according to the embodiment has the delay control unit 5 that delays a packet read from the external buffers 20, 20a according to a read delay time T_buf for the buffers 20, 20a, the read delay time T_buf being calculated based on the packet lengths and the packet interval of packets which are inputted to the buffers 20, 20a. Therefore, the packet transmission device according to the embodiment achieves the operational effect similar to that of the above-described packet relay device 1.

So far, details of the present disclosure have been specifically described with reference to the preferred embodiments. It is apparent that various modifications may occur to those skilled in the art based on the basic technical idea and teaching of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet relay device, comprising:
   a first buffer configured to store a packet; and
   a processor coupled to the first buffer and configured to:
      calculate a delay time for reading from the first buffer based on a packet length and a packet interval of the packet relative to at least one other packet which is inputted to the first buffer subsequent to the packet, the calculated delay time being adjusted according to an internal processing of the first buffer which varies due to an amount of unread data including the packet in the first buffer, and
      delay reading the packet from the first buffer to a timing determined using the calculated delay time.

2. The packet relay device according to claim 1,
   wherein the processor is configured to:
      assign delay information to the at least one other packet, the delay information indicating the calculated delay time, and
      acquire the calculated delay time by extracting the delay information from the packet.

3. The packet relay device according to claim 2,
   wherein the processor is configured to:
      read the packet from the first buffer, and
      assign the delay information to the at least one other packet.

4. The packet relay device according to claim 1, further comprising:
   a plurality of queues configured to store the packet read from the first buffer, distinguishing a priority packet and a non-priority packet,
   wherein the processor is configured to:
      select one of the plurality of queues to be read for the packet,
      obtain the selected one of the plurality of queue and a timing for reading the packet from the selected one of the plurality of queues, and
      determine a timing for reading the priority packet from the selected one of the plurality of queues according to the delay time for reading the priority packet.

5. The packet relay device according to claim 4,
   wherein the processor is configured to determine the timing for reading the priority packet according to the delay time for reading the priority packet and a standby time in which the priority packet is kept on standby due to reading the non-priority packet.

6. The packet relay device according to claim 5, further comprising:
   a second buffer provided at output side of the plurality of queues and configured to store the packet which is read from the plurality of queues,
   wherein the processor is configured to:
      calculate a delay time for reading the priority packet from the second buffer based on the determined timing, and
      correct the determined timing according to the calculated delay time for reading the priority packet from the second buffer.

7. The packet relay device according to claim 4,
   wherein when the delay time for reading the priority packet is longer than a threshold value, the processor is configured to cause one of the plurality of queues which stores the priority packet to discard the priority packet.

8. The packet relay device according to claim 1, wherein the packet being read from the first buffer is a synchronous message and the delay time is calculated for reading the synchronous message from the first buffer based on the packet length and the packet interval between the at least one other packet and the synchronous message.

9. The packet relay device according to claim 1, wherein the delay time is calculated when determining the at least one other packet is inputted to the first buffer subsequent to the packet that is a synchronous message,
   the delay time is calculated based on the packet length and the packet interval of the packet and the synchronous message, and the synchronous message includes time information.

10. The packet relay device according to claim 1, wherein the calculated delay time is further based on a difference between a timing for outputting the packet and a timing for outputting the at least one other packet when the at least one other packet is input into the first buffer subsequent to the packet.

11. A packet relay device, comprising:
   a plurality of queues configured to store a packet, distinguishing a priority packet and a non-priority packet;
   a processor configured to:
      select one of the plurality of queues to be read for a packet,
      obtain the selected one of the plurality of queues and a timing for reading the packet from the selected one of the plurality of queues,
      determine a timing for reading the priority packet from the selected one of the plurality of queues according to a standby time in which the priority packet is kept on standby due to reading the non-priority packet,
      calculate a delay time for reading the priority packet from a first buffer based on the determined timing, the calculated delay time being adjusted according to an internal processing of the first buffer which varies due to an amount of unread data including the non-priority packet, and
      correct the determined timing of reading the priority packet from the first buffer to a timing determined using the calculated delay time; and a second buffer provided at output side of the plurality of queues and configured to store the packet read.

12. A packet transmission device, comprising:
a memory; and
a processor coupled to the memory and configured to:
delay reading a packet from a first buffer to a timing determined using a delay time, the delay time being calculated based on a packet length and a packet interval of the packet relative to at least one other packet which is inputted to the first buffer subsequent to the packet,
wherein the calculated delay time being adjusted according to an internal processing of the first buffer which varies due to an amount of unread data including the packet in the first buffer.

13. The packet transmission device according to claim 12, wherein the processor is configured to acquire the delay time by extracting delay information from the packet, the delay information which indicates the delay time being assigned to the at least one other packet.

14. The packet transmission device according to claim 12, further comprising:
a plurality of queues configured to store the packet read from the first buffer, distinguishing a priority packet and a non-priority packet, and
wherein the processor is configured to:
select one of the plurality of queues to be read for the packet,
obtain the selected one of the plurality of queue and a timing for reading the packet from the selected one of the plurality of queues, and
determine a timing for reading the priority packet from the selected one of the plurality of queues according to the delay time for reading the priority packet.

15. The packet transmission device according to claim 12, wherein the processor is configured to determine the timing for reading the priority packet according to the delay time for reading the priority packet and a standby time in which the priority packet is kept on standby due to reading the non-priority packet.

16. The packet transmission device according to claim 15, further comprising:
a second buffer provided at output side of the plurality of queues and configured to store the packet which is read from the plurality of queues,
wherein the processor is configured to:
calculate a delay time buffer for reading the priority packet from the second based on the determined timing, and
correct the determined timing according to the calculated delay time for reading the priority packet from the second buffer.

* * * * *